(12) United States Patent
Yunoki

(10) Patent No.: US 10,341,944 B2
(45) Date of Patent: *Jul. 2, 2019

(54) ACCESS POINT, WIRELESS TERMINAL, STORAGE MEDIUM, AND METHOD UTILIZING POINTER SIGNAL TO COMMUNICATE IN AVAILABLE CHANNEL

(71) Applicant: KDDI CORPORATION, Tokyo (JP)

(72) Inventor: Katsuo Yunoki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 15/663,350

(22) Filed: Jul. 28, 2017

(65) Prior Publication Data

US 2017/0332314 A1 Nov. 16, 2017

Related U.S. Application Data

(62) Division of application No. 14/785,917, filed as application No. PCT/JP2014/061095 on Apr. 18, 2014, now Pat. No. 9,961,620.

(30) Foreign Application Priority Data

May 23, 2013 (JP) .................................. 2013-108475

(51) Int. Cl.
  *H04W 48/16* (2009.01)
  *H04W 76/10* (2018.01)
  *H04W 84/12* (2009.01)

(52) U.S. Cl.
  CPC ........... *H04W 48/16* (2013.01); *H04W 76/10* (2018.02); *H04W 84/12* (2013.01)

(58) Field of Classification Search
  None
  See application file for complete search history.

(56) References Cited

U.S. PATENT DOCUMENTS

2005/0068928 A1   3/2005  Smith et al.
2005/0153692 A1   7/2005  Hwang et al.
           (Continued)

FOREIGN PATENT DOCUMENTS

CN       1674689 A    9/2005
JP    2005-012539 A    1/2005
            (Continued)

OTHER PUBLICATIONS

IEEE802.11-10/0922r2, "Achievable Gains in AP Discovery." Retrieved Online, <https://mentor.ieee.org/802.11/dcn/10/11-10-0922-02-0fia-achievable-gains-in-ap-discovery.pptx>.

(Continued)

*Primary Examiner* — Kodzovi Acolatse
(74) *Attorney, Agent, or Firm* — Oliff PLC

(57) ABSTRACT

A system, a program and a method allow a wireless terminal to discover an objective access point with a comparatively small amount of consumption energy and in a comparatively short waiting time. The access point (AP) includes: an AP WLAN communicator communicating using a predetermined available channel of a first frequency band; a pointer signal generator generating a pointer signal including available-channel information in the first frequency band and a network identifier; and an AP pointer signal communicator using a specific channel of a second frequency band to send the pointer signal to the wireless terminal. While, the wireless terminal receives the pointer signal through the specific channel and controls, in response to the available channel information and network identifier included in the pointer signal, for waiting for receiving a beacon or a probe response transmitted in the first frequency band from the objective access point.

14 Claims, 13 Drawing Sheets

(56) References Cited

U.S. PATENT DOCUMENTS

| | | | |
|---|---|---|---|
| 2005/0197136 A1 | 9/2005 | Friday et al. | |
| 2006/0009246 A1* | 1/2006 | Marinier | H04W 8/005 |
| | | | 455/502 |
| 2006/0056367 A1 | 3/2006 | Marinier et al. | |
| 2006/0089138 A1* | 4/2006 | Smith | H04W 52/0229 |
| | | | 455/426.1 |
| 2006/0268756 A1* | 11/2006 | Wang | H04W 36/32 |
| | | | 370/310 |
| 2007/0047480 A1 | 3/2007 | Suga | |
| 2008/0123588 A1 | 5/2008 | Rudolf et al. | |
| 2008/0240017 A1 | 10/2008 | Kaidar et al. | |
| 2009/0323608 A1* | 12/2009 | Adachi | H04W 48/18 |
| | | | 370/329 |
| 2013/0028245 A1 | 1/2013 | Oerton et al. | |
| 2013/0235852 A1 | 9/2013 | Segev et al. | |
| 2014/0126503 A1 | 5/2014 | Kim et al. | |
| 2014/0177548 A1 | 6/2014 | Aihara | |
| 2015/0043366 A1* | 2/2015 | Kneckt | H04L 43/0852 |
| | | | 370/252 |

FOREIGN PATENT DOCUMENTS

| | | |
|---|---|---|
| JP | 2005-184824 A | 7/2005 |
| JP | 2007-067745 A | 3/2007 |
| JP | 2008512953 A | 4/2008 |
| WO | 2004/054283 A2 | 6/2004 |
| WO | 2006/017024 A2 | 2/2006 |
| WO | 2006031493 A2 | 3/2006 |
| WO | 2006/107698 A2 | 10/2006 |
| WO | 2007/031855 A2 | 3/2007 |

OTHER PUBLICATIONS

Jul. 22, 2014 International Search Report issued in International Patent Application No. PCT/JP2014/061095.

Nov. 24, 2015 International Preliminary Report on Patentability issued in International Patent Application No. PCT/JP2014/061095.

Jan. 5, 2017 Office Action Issued in U.S. Appl. No. 14/785,917.

Mar. 20, 2017 European Search Report issued in European Application No. 14801741.1.

Jun. 9, 2017 Office Action Issued in U.S. Appl. No. 14/785,917.

Jan. 26, 2018 Office Action issued in Chinese Patent Application No. 201480024449X.

Feb. 5, 2018 Search Report issued in European Patent Application No. 17191455.9.

Jul. 31, 2018 Office Action issued in Japanese Patent Application No. 2013-108475.

Aug. 1, 2018 Notice of Reasons for Refusal issued in Japanese Patent Application No. 2017-132908.

\* cited by examiner

ACCESS POINT, WIRELESS TERMINAL, STORAGE MEDIUM, AND METHOD UTILIZING POINTER SIGNAL TO COMMUNICATE IN AVAILABLE CHANNEL

This is a divisional application of application Ser. No. 14/785,917 filed Oct. 21, 2015, which is a national phase of PCT/JP2014/061095 filed Apr. 18, 2014, which claims priority to JP2013-108475 filed May 23, 2013. The disclosures of the prior applications are hereby incorporated by reference herein in their entirety.

TECHNICAL FIELD

The present invention relates to technology of communication sequences in wireless LAN (WLAN, Wireless Local Area Network) where a wireless terminal discovers an access point to be connected.

This application claims the benefit of priority under the Paris Convention from Japanese patent application No. 2013-108475, filed on May 23, 2013, which is incorporated herein by reference in accordance with PCT rule 20.6.

BACKGROUND ART

FIG. 1 is a schematic diagram showing the configuration of a system including a wireless terminal and access points.

According to FIG. 1, access points 1 are connected to the Internet through access networks while they communicate with a wireless terminal 2 through the air. A wireless terminal 2 staying in an area of WLAN configured around an access point 1 is allowed to be connected to the Internet (a host network) via the access point 1. The wireless terminal 2 shown in FIG. 1 is in a position where the terminal can communicate with three access points 1. As an example, the wireless terminal 2 discovers an objective access point AP2 to be connected with the terminal, then uses the discovered access point AP2 in order to be connected to the Internet via the access point AP2.

WLANs are generally configured to adopt techniques working in MAC (Media Access Control) layer to control packet transmission between wireless terminals and access points. The structure of MAC frames exchanged between wireless stations via the MAC layer is prescribed, for example, in the IEEE802.11 standard.

Infrastructure mode specified in the IEEE802.11 standard provides two kinds of scan method, "active scan method" and "passive scan method", for a wireless terminal discovering an access point in a WLAN. The "active scan method" is a method in which a wireless terminal broadcasts a probe request toward access points and then receives a probe response from each access point to thereby discover the access point to be connected with the terminal. On the other hand, the "passive scan method" is such that an access point broadcasts beacons at regular intervals and a wireless terminal receives the broadcasted beacon to thereby discover the access point to be connected with the terminal. Note that the beacons, the probe requests and the probe responses are kinds of control signals for communication management which are exchanged between access point(s) and wireless terminal(s).

Generally, wireless terminals are equipped with both functions of performing active scan method and passive scan method. The wireless terminal, when discovering an objective access point by either of these two methods, performs a processing sequence for connection with the objective access point to be connected.

FIG. 2 is a sequence diagram showing a sequence based on the active scan method.

As shown in FIG. 2, first, a wireless terminal 2 transmits a probe request in a broadcasting way. During such frame-broadcasting, the wireless terminal 2 may consume more electric power. The probe request broadcasted by the wireless terminal 2 is received by all the access points 1 (AP1, AP2 and AP3) which employ common channels and are located in a range where the electric wave of the probe request can reach.

In response to receiving the probe request, the respective access points 1 send probe responses to the wireless terminal 2. In transmitting the probe responses, access points 1 control the timing of transmission by means of the techniques working for the MAC layer of WLAN so that the sent probe responses do not collide with each other. For example, there adopted is a Carrier Sense Multiple Access with Collision Avoidance (CSMA/CA) method in which a plurality of terminals can establish communication sessions by making mutual concessions in terms of timing when obtaining a common WLAN channel to be used.

Meanwhile, the wireless terminal 2 waits (stands by), during a comparatively short time, for a probe response with comparatively small power consumption. When receiving within the waiting time a probe response sent from the objective access point AP2 to be connected, the wireless terminal 2 carries out a connection sequence with the access point AP2.

FIG. 3 is a sequence diagram showing a sequence based on the passive scan method.

As shown in FIG. 3, first, access points 1 transmit beacons at regular intervals in a broadcasting way. Meanwhile, a wireless terminal 2 waits (stands by), using comparatively small power consumption, for a beacon during a comparatively long time equal to or longer than the transmission period of the beacons. When receiving within the waiting time a beacon sent from the objective access point AP2 to be connected, the wireless terminal 2 carries out a connection sequence with the access point AP2.

The access points 1 broadcast the beacons regularly (for example, at an interval of about 100 milliseconds) in, e.g., the 2.4 GHz band. The wireless terminal 2 then tries to sense (searches for) a beacon in each of, e.g., ten channels of the 2.4 GHz band, the beacon being broadcasted from the access point that is a connection party. Here, the wireless terminal 2 has to await the beacon for 100 milliseconds (msec) or more in every channel. This results in requiring the waiting time of about 1 second calculated as follows for searching all the channels.

100 msec×10 channels=1 sec

In the case where the wireless terminal 2 is a battery-driven portable-phone or smartphone, it is critical from a viewpoint of suppressing electric power consumption to shorten the waiting time as much as possible.

As explained above, the active scan method realizes a comparatively short waiting time for receiving probe responses though requiring a temporal increase in power consumption when sending the probe request. On the other hand, the passive scan method needs a comparatively long waiting time for receiving beacons although not requiring so much electric power. Accordingly, the active scan method, which is able to discover an access point in a comparatively short time, achieves smaller total power consumption than that of the passive scan method. Therefore, wireless terminals generally adopt the "active scan method" that consumes comparatively small power and discovers an access point in a comparatively short time. When entering the area of an access point to be connected, the wireless terminal receives a probe response replied in response to a probe request transmitted by the terminal in the active scan method, to thereby discover the target access point.

As an example of such a conventional technology, Patent Document No. 1 discloses a technique in which, when trying to discover an access point, a wireless terminal adopts respective active scan method and passive scan method selectively based on whether the terminal is inside or outside the communication range.

CITATION LIST

Patent Documents

Patent Document No. 1: Japanese Patent Laid-Open Publication No. 2005-12539

Non-Patent Documents

Non-patent Document No. 1: IEEE802.11-10/0922r2, "Achievable Gains in AP Discovery", [online], [Searching on May 13, 2013], the Internet <URL: https://mentor.ieee.org/802.11/dcn/10/11-10-0922-02-0fia-achievable-gains-in-ap-discovery.pptx>

SUMMARY OF THE INVENTION

Problem to be Solved by the Invention

However, as pointed out in, e.g., Non-patent Document No. 1, those conventional techniques have a problem that it tends to take a comparatively long time for a wireless terminal to discover an access point via a WLAN. Access points installed in public areas can generally be connected freely with wireless terminals of general users. On the other hand, the wireless terminals know, in many cases, neither channels used by the access points nor installation places of the access points. Therefore, the wireless terminals need to periodically search all channels that may be used, thus to make sure whether the objective access point to be connected exists or not. It takes a considerably long time for the terminals to carry out such a searching sequence.

In the "active scan method", the wireless terminal generally transmits one probe request in a broadcasting way without designating a network identifier of an objective access point. All the access points, including nonobjective access points, located around the terminal's current position receive the broadcasted probe request, and then respond with probe responses. The wireless terminal, in response to receiving the probe responses, conducts a connection process only with an access point that has sent a probe response including the network identifier of the objective access point. Therefore, the probe responses sent by the nonobjective access points not to be connected are ignored by the wireless terminal, thus to uselessly waste wireless network resources.

Specifically, according to Non-patent Document No. 1, it can be calculated as follows how long it takes to discover an objective access point:

about 15 msec in the case of performing active scanning for one channel of the 2.4 GHz band;

about 100 msec in the case of performing passive scanning for one channel of the 5 GHz band; and 2095 msec (=15 msec×13ch+100 msec×19ch) in the case of searching in all the 13 channels of the 2.4 GHz band and in all the 19 channels of the 5 GHz band.

On the other hand, the "passive scan method" has no need to broadcast a probe request from the wireless terminal and then experiences no probe response reception, to thereby suppress useless consumption of wireless network resources.

However, as described above, the passive scan method has a problem that it requires the wireless terminal to await beacons for a long time thereby to be inferior to the active scan method in energy saving.

Specifically, there can be calculated as follows "the amount of energy needed for transmitting a probe request" in the active scan method as shown in FIG. 2.

"The amount of electric power needed for transmitting signal in the terminal"=200 milliwatts (mW) (assumed value)

"The amount of electric power needed for receiving signal in the terminal"=40 mW (assumed value)

"The data size of a probe request"=300 bytes (assumed value)

"The data rate in transmitting a probe request"=6 Mbps (assumed value)

$$\text{"The time needed for transmitting a probe request"} =$$
$$(300 \text{ bytes} \times 8 \text{ bits}) / (6 \times 10^{\wedge}6 \text{ bps}) = 400 \times 10^{\wedge} - 6 \text{ sec}$$
$$\text{"The amount of electric power needed}$$
$$\text{for transmitting a probe request"} =$$
$$200 \text{ mW} \times \text{"time needed for transmission"} =$$
$$200 \text{ mW} \times (400 \times 10^{\wedge} - 6 \text{ sec}) = 80 \times 10^{\wedge} - 6 \text{ Joules (J)}$$

Also, there can be calculated as follows "the amount of energy needed for awaiting and then receiving a probe response".

$$\text{"the amount of energy needed for waiting for and then receiving}$$
$$\text{a probe response"} = 40 \text{ mW} \times 15 \text{ msec} = 600 \times 10^{\wedge} - 6 \text{ J}$$

As a result, "the amount of energy needed for the scanning per channel" in the active scan method is calculated as follows.

$$\text{"the amount of energy needed for the scanning per channel"} =$$
$$80 \text{ μJ} + 600 \text{ μJ} = 680 \text{ μJ}$$

On the other hand, there can be calculated as follows "the amount of energy needed for waiting for and then receiving beacon" in the passive scan method as shown in FIG. 3.

"waiting time for beacon per channel"=100 msec $$\text{"the amount of energy needed for waiting for and then}$$
$$\text{receiving beacon"} = 40 \text{ mW} \times 100 \text{ msec} = 4000 \text{ μJ}$$

Consequently, it is understood that the amount of energy 4000 μJ consumed when using the passive scan method is larger than the amount of energy 680 μJ consumed in the active scan method.

According to Patent Document No. 1, a wireless terminal generally performs the active scan method to send a prove request when recognizing that the terminal is in an area covered by an access point (or when the terminal user performs a corresponding operation, or when an installed application requests to send or receive data). On the contrary, when recognizing that the terminal is not in any under-access-point area, the wireless terminal performs the passive scan method to wait for beacons.

Primarily, when staying in such an area covered by the access point, wireless terminals should save wireless network resources sufficiently. However, as mentioned above, the wireless terminal described in Patent Document No. 1 performs in the area the active scan method which consumes more wireless network resources. On the other hand, at a location that is not covered by any access point, where suppression of wireless resource consumption is not largely important, the wireless terminal performs the passive scan method which requires a large amount of consumption energy due to comparatively long waiting time. In the first place, general wireless terminals have no means for recognizing whether or not they stay in an under-access-point area.

It is therefore an object of the present invention to provide a system allowing a wireless terminal to discover an objective access point in a comparatively short waiting time and with a comparatively small amount of consumption energy, the associated program, and a method for discovering the access point in such a manner.

Means to Solve the Problem

The present invention is characterized in that, in a system in which one or more wireless terminals communicate with one or more access points through a Wireless Local Area Network (WLAN), the access point comprises: an access-point (AP) WLAN communicator using a predetermined available channel of a first frequency band to communicate with the wireless terminal; a pointer signal generator generating a pointer signal including available-channel information for the available channel of the first frequency band and a network identifier; and an AP pointer signal communicator using a specific channel of a second frequency band to send the pointer signal to the wireless terminal, and that the wireless terminal comprises: a specific-channel memorizer memorizing beforehand the specific channel used for the pointer signal; a terminal pointer signal communicator receiving the pointer signal through the specific channel of the second frequency band; and a terminal WLAN communicator, operative in response to the available channel information and the network identifier which are included in the pointer signal, controlling for waiting for receiving a beacon or a probe response which is a response to a sent probe request, the beacon or the probe response being transmitted in the first frequency band from the objective access point to be connected.

As one embodiment of the system according to the present invention, it is preferable that the first frequency band be a 5 GHz band or 2.4 GHz band prescribed in the IEEE802.11 standard, and the second frequency band be a 2.4 GHz band or 5 GHz band prescribed in the IEEE802.11 standard.

As another embodiment of the system according to the present invention, it is also preferable that the access point further comprise a time difference calculator calculating time difference information including a time difference between a current time and a time when a next beacon is transmitted in the available channel, that the pointer signal generator of the access point further include the time difference information into the pointer signal, and that the terminal pointer signal communicator of the wireless terminal wait for sensing the beacon transmitted in the available channel at a timing when a time difference elapses after receiving the pointer signal, the time difference being obtained based on the time difference information included in the pointer signal.

As another embodiment of the system according to the present invention, it is also preferable that, in a case where the pointer signal includes a plurality of pairs of the available channel information and the network identifier, each of the pairs being associated with the time difference information, the wireless terminal further comprise a reception standby controller controlling for waiting for sensing the beacon transmitted in each available channel sequentially according to the order of the available channel associated with less time difference.

As another embodiment of the system according to the present invention, it is also preferable that the access point send the pointer signal periodically or sends the pointer signal when receiving a pointer request transmitted to the access point from the wireless terminal, and that the wireless terminal wait for receiving the pointer signal continuously or wait for receiving the pointer signal after sending the pointer request to the access point.

As another embodiment of the system according to the present invention, it is also preferable that, when receiving no pointer signal by a predetermined number of times or during a predetermined time, the terminal WLAN communicator of the wireless terminal try to sense a beacon in every channel of the first frequency band or to sense a probe response after sending a probe request.

As another embodiment of the system according to the present invention, it is also preferable that the specific-channel memorizer memorize specific-channel information for specific channel(s) each associated with an expiration period, and that the wireless terminal, without receiving any pointer signal transmitted in the specific channel whose expiration period passed, sense a beacon in every channel of the first frequency band or sense a probe response after sending a probe request.

As another embodiment of the system according to the present invention, it is also preferable that the access point include specific-channel information for the specific channel of the second frequency band, through which the pointer signal is transmitted, into the beacon transmitted through each available channel of the first frequency band or into the probe response to be sent after receiving the probe request, and that, when discovering the objective access point to be connected after sensing the beacon in each channel of the first frequency band or sensing the probe response following the sent probe request, the wireless terminal use the specific-channel information included in the beacon or probe response received from the access point to update the specific channel memorized by the specific-channel memorizer.

As another embodiment of the system according to the present invention, it is also preferable that the system further comprise a pointer managing server accumulating location information and specific-channel information for every access point, that the access point further comprise a specific-channel change detector informing the pointer managing server of a change of the current specific channel to another specific channel when detecting the current specific channel being unusable for sending the pointer signal, and that the pointer managing server, when receiving information of the change of the current specific channel from the access point, direct one or more access points located in an predetermined range from the access point to change the specific channel to the another specific channel.

As another embodiment of the system according to the present invention, it is also preferable that the wireless terminal further comprise a specific-channel requester sending to the pointer managing server a request including the network identifier of the objective access point to be connected in order to obtain the specific channel through which the pointer signal is to be received, and that the pointer managing server return to the wireless terminal a response including specific-channel information for the specific channel through which transmitted is the pointer signal of the access point associated with the network identifier.

As another embodiment of the system according to the present invention, it is also preferable that the system further comprise a base station communicating with the wireless terminal through a Wireless Wide Area network (WWAN) and broadcasting a control signal including a base station identifier of itself, that the wireless terminal further comprise: a terminal WWAN communicator receiving the control signal including the base station identifier through the WWAN from the base station; and a specific-channel requester sending to the pointer managing server a request including the base station identifier, and that the pointer managing server return to the wireless terminal a response including the specific-channel information for the specific channel through which transmitted is the pointer signal of one or more access points located on the periphery of the base station associated with the base station identifier.

As another embodiment of the system according to the present invention, it is also preferable that the system further comprise a base station communicating with the wireless terminal through a WWAN and broadcasting a control signal including a base station identifier of itself, that the base station obtain from the pointer managing server the specific-channel information of the specific channel through which transmitted is the pointer signal of one or more access points located on the periphery of the base station associated with the base station identifier and broadcasts the control signal including the obtained specific-channel information, and that the wireless terminal further comprise a terminal WWAN communicator receiving the control signal including the specific-channel information through the WWAN from the base station.

As another embodiment of the system according to the present invention, it is also preferable that the specific-channel memorizer of the wireless terminal memorize the specific-channel information associated further with the base station identifier, and that the terminal pointer signal communicator uses the base station identifier included in the control signal sent from the base station to specify the specific channel of the second frequency band by accessing the specific-channel memorizer.

The present invention is also characterized in that an access point, which communicates with one or more wireless terminals through a WLAN, comprises: an AP WLAN communicator using a predetermined available channel of a first frequency band to communicate with the wireless terminal; a pointer signal generator generating a pointer signal including available-channel information for the available channel of the first frequency band and a network identifier; and an AP pointer signal communicator using a specific channel of a second frequency band to send the pointer signal to the wireless terminal.

The present invention is also characterized in that a wireless terminal, which communicates with the above-described access point through the WLAN, comprises: a specific-channel memorizer memorizing beforehand the specific channel used for sending the pointer signal; a terminal pointer signal communicator receiving the pointer signal through the specific channel of the second frequency band; and a terminal WLAN communicator, operative in response to the available-channel information and the network identifier which are included in the pointer signal, controlling for waiting for receiving a beacon or a probe response which is a response to a sent probe request, the beacon or the probe response being transmitted in the first frequency band from the objective access point to be connected.

The present invention is also characterized in that a program, which is to be executed by a computer mounted on an access point communicating with one or more wireless terminals through a WLAN, causes the computer to function as: an AP WLAN communicator using a predetermined available channel of a first frequency band to communicate with the wireless terminal; a pointer signal generator generating a pointer signal including available-channel information for the available channel of the first frequency band and a network identifier; and an AP pointer signal communicator using the specific channel of a second frequency band to send the pointer signal to the wireless terminal.

The present invention is also characterized in that a program, which is to be executed by a computer mounted on a wireless terminal communicating with the above-described access point through the WLAN, causes the computer to function as: a specific-channel memorizer memorizing beforehand the specific channel used for sending the pointer signal; a terminal pointer signal communicator receiving the pointer signal through the specific channel of the second frequency band; and a terminal WLAN communicator, operative in response to the available-channel information and the network identifier which are included in the pointer signal, controlling for waiting for receiving a beacon or a probe response which is a response to a sent probe request, the beacon or the probe response being transmitted in the first frequency band from the objective access point to be connected.

The present invention is also characterized in that a method, in which a wireless terminal discovers an access point through a WLAN, comprises: a first step, in the access point, of generating the pointer signal including available-channel information for an available channel of a first frequency band and a network identifier; a second step, in the access point, of using a specific channel of a second frequency band to send the pointer signal to the wireless terminal which memorizes beforehand the specific channel used for receiving the pointer signal; a third step, in the wireless terminal, of receiving the pointer signal through the specific channel of the second frequency band; and a fourth step, in the wireless terminal, of controlling for waiting for receiving a beacon or a probe response which is a response to a sent probe request, the beacon or the probe response being transmitted in the first frequency band from the objective access point to be connected, in response to the available-channel information and the network identifier included in the pointer signal.

Advantageous Effects of the Invention

A system, a program and a method according to the present invention allows a wireless terminal to discover an objective access point in a comparatively short waiting time and with a comparatively small amount of consumption energy.

EMBODIMENTS OF THE INVENTION

Illustrative embodiments of the present invention will be described below with reference to the drawings.

Figure 4:
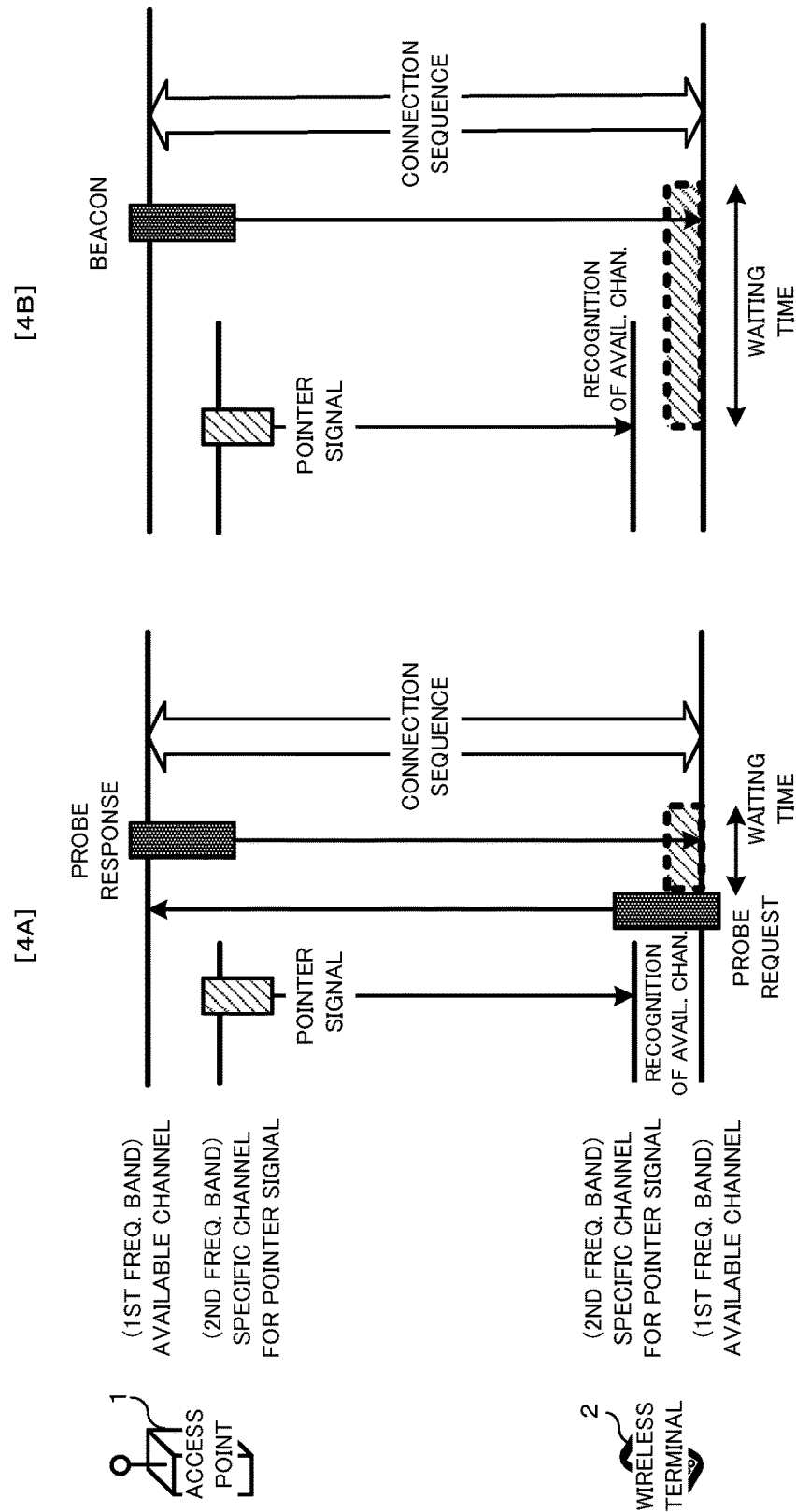
FIG. 4 is a sequence diagram illustrating one embodiment of a method for discovering an objective access point according to the present invention.

FIG. 4 is a sequence diagram illustrating one embodiment of a method for discovering an objective access point according to the present invention.

As illustrated in FIG. 4, an access point 1 and a wireless terminal 2 communicate with each other via radio. Here, the communication between the access point 1 and the wireless terminal 2 uses at least two frequency bands. At least one frequency band (the first frequency band) is based on the infrastructure mode of Wireless Local Area Network (WLAN) specified in the IEEE802.11, and there established are available channels adapted for transmitting and receiving user data. The other frequency band(s) (the second frequency band) is used, whether or not being based on WLAN, for transmitting and receiving a "pointer signal" of the present invention.

The "pointer signal" is defined as a control signal including an "available channel information" of the first frequency band and an "SSID (Service Set ID)" as a network identifier. The wireless terminal 2 can find out an available channel of the first frequency band immediately by receiving the pointer signal through the second frequency band.

Figure 1:
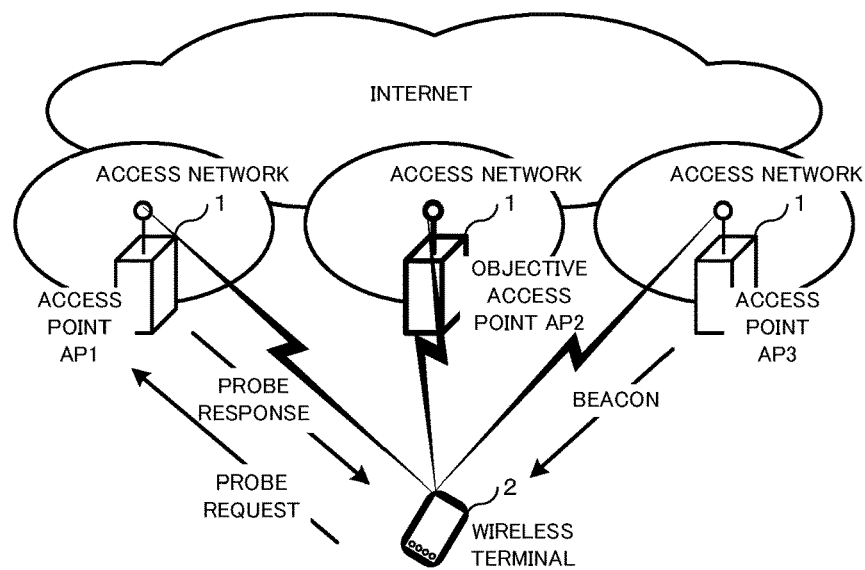
FIG. 1 is a schematic diagram showing the configuration of a system including a wireless terminal and access points.
Figure 2:
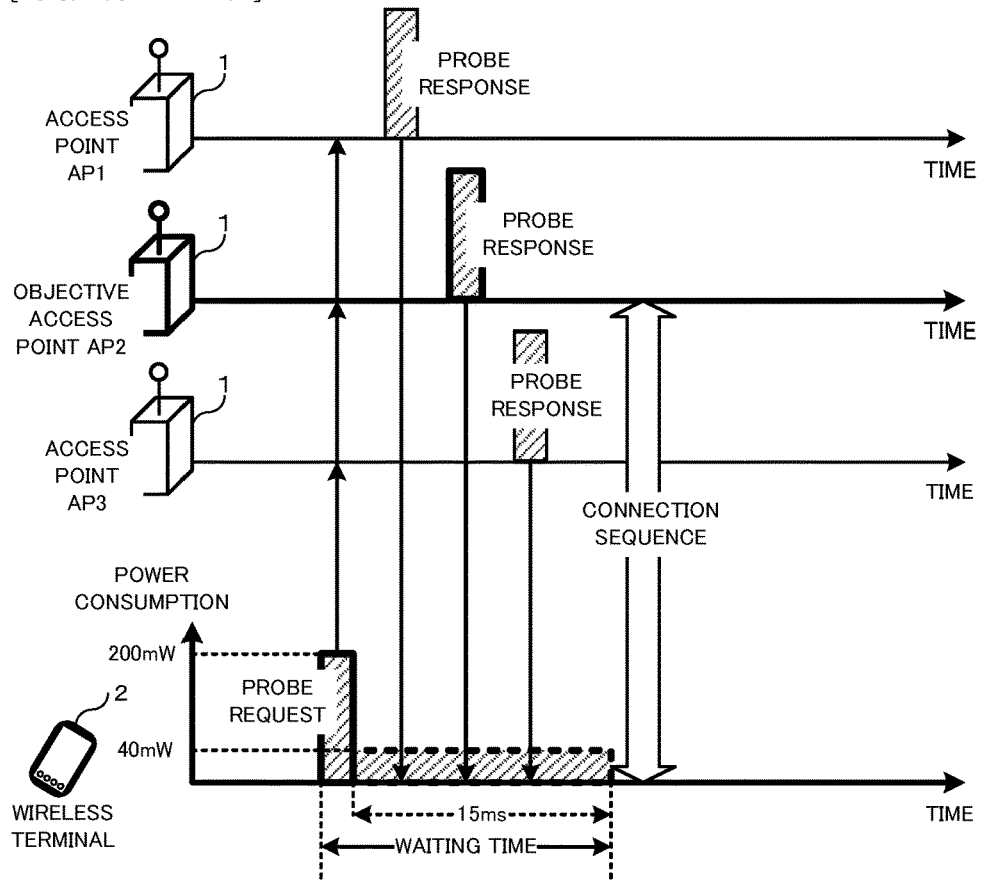
FIG. 2 is a sequence diagram showing a sequence based on the active scan method.

Diagram [4A] of FIG. 4, as well as FIG. 2 shown above, shows communication sequence to which applied is an active scan method. The access point 1 always broadcasts pointer signals using the second frequency band. The wireless terminal 2, when receiving the pointer signal, knows the available channel information of the first frequency band and the SSID. Afterwards, the communication sequence becomes the same as the existing active scan method. That is, the wireless terminal 2 transmits a probe request using the first frequency band, and then receives a probe response from the access point 1. Hereby, the wireless terminal 2 discovers an objective access point 1 to be connected in the first frequency band to execute a communication connection sequence with the discovered access point 1.

Figure 3:
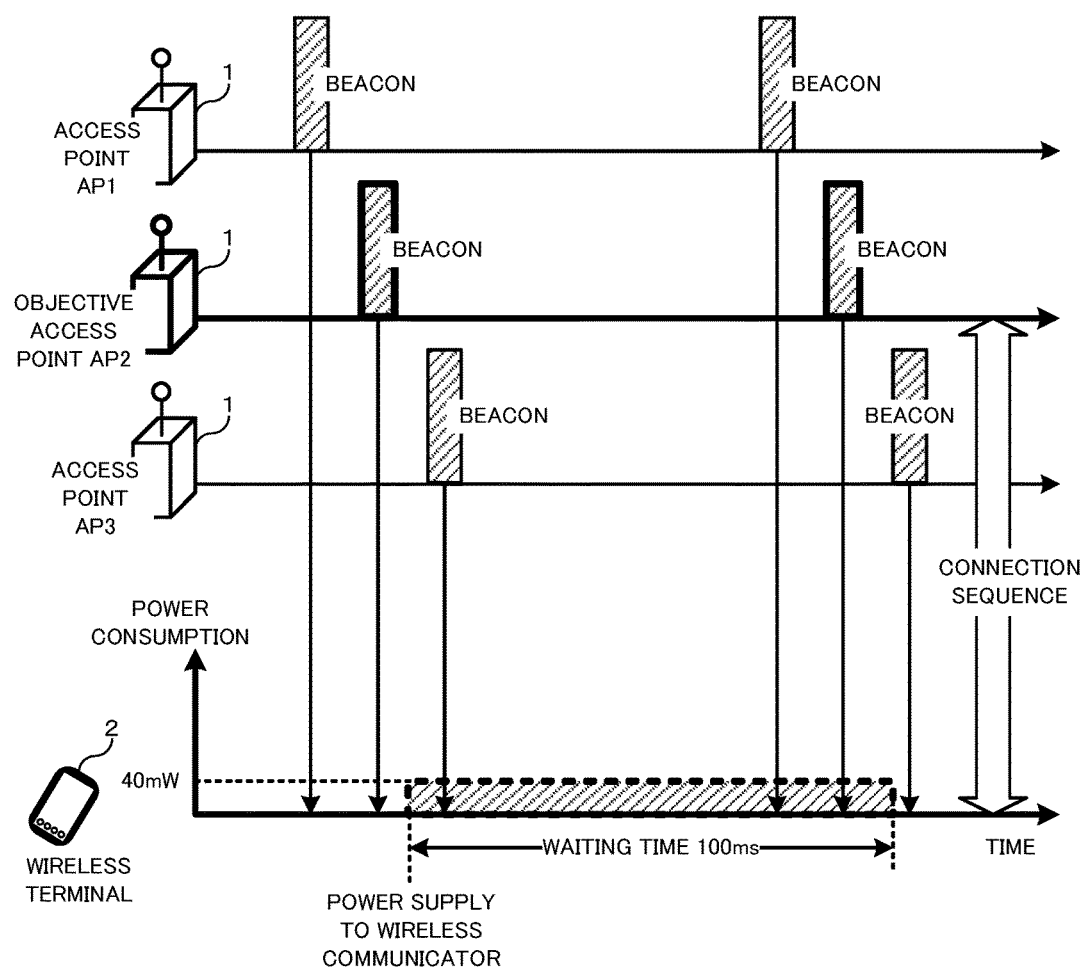
FIG. 3 is a sequence diagram showing a sequence based on the passive scan method.

On the other hand, diagram [4B] of FIG. 4, as well as FIG. 3 shown above, indicates communication sequence to which applied is a passive scan method. The access point 1 always broadcasts pointer signals using the second frequency band. The wireless terminal 2, when receiving the pointer signal, knows the available channel information of the first frequency band and the SSID. After that, the communication sequence becomes the same as the existing passive scan method. That is, the wireless terminal 2 waits (stands by) for receiving a beacon using the first frequency band. The wireless terminal 2, when receiving the beacon from access points 1, discovers an objective access point 1 to be connected in the first frequency band to execute a communication connection sequence with the discovered access point 1.

Figure 5:
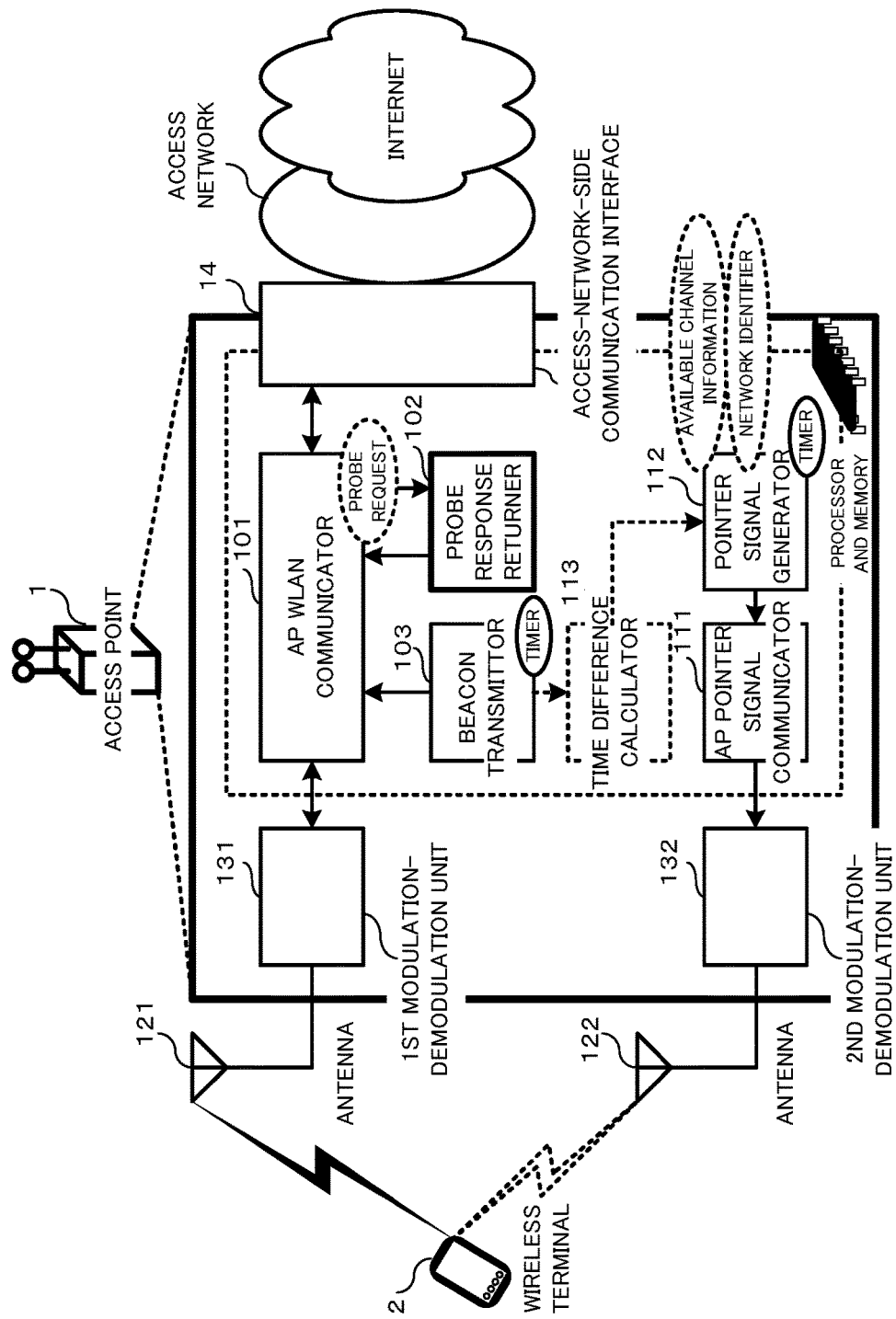
FIG. 5 is a functional block diagram illustrating the first embodiment of an access point according to the present invention.

FIG. 5 is a functional block diagram illustrating the first embodiment of an access point according to the present invention.

The access point 1 is constructed to include, as hardware, two antennas 121 and 122 that communicate with wireless terminal(s) 2, the first modulation-demodulation unit 131 connected with the antenna 121, the second modulation-demodulation unit 132 connected with the antenna 122, and an access-network-side communication interface 14. The antenna 121 and the first modulation-demodulation unit 131 support the communication in the first frequency band, being based on a communication method prescribed in the IEEE802.11 at least. While, the antenna 122 and the second modulation-demodulation unit 132 support the communication in the second frequency band, whether or not being based on a communication method prescribed in the IEEE802.11. Note that the first modulation-demodulation unit 131 and the second modulation-demodulation unit 132 may share a single antenna, utilizing each signal into which separated, by using such as a band-pass filter, are both signals transmitted respectively in the first and second frequency bands.

The access point 1 further includes, as functional units, an access-point (AP) WLAN communicator 101, a probe response returner 102, a beacon transmitter 103, an AP pointer signal communicator 111, a pointer signal generator 112, and time difference calculator 113. These functional units are embodied by executing a corresponding program on a computer mounted on the access point.

(AP WLAN Communicator 101)

The AP WLAN communicator 101 is configured to execute a protocol control specified in the IEEE802.11 between the first modulation-demodulation unit 131 and the access-network-side communication interface 14. That is, the AP WLAN communicator 101 communicates with wireless terminal(s) 2 using a predetermined available channel of the first frequency band in the WLAN. Further, the AP WLAN communicator 101, when detecting a probe request used in the active scan method, outputs the detection result to the probe response returner 102. Furthermore, the AP WLAN communicator 101 is configured to send to wireless terminal(s) 2 a probe response outputted from the probe response returner 102 or a beacon outputted from the beacon transmitter 103.

The probe response returner 102 is configured to output, when receiving a probe request used in the active scan method, to the AP WLAN communicator 101 an instruction to return a probe response to the wireless terminal 2. Specifically, the probe response returner 102 sets the MAC address of the wireless terminal 2, which has sent the probe request, as a MAC address for the destination of the probe response. Note that the probe response returner 102 returns the probe response when an objective SSID included in the received probe request coincides with the SSID of the access point 1 itself. Also, even if the received probe request includes no SSID, it returns a probe response which includes the SSID of the access point 1 itself. The probe response is sent through the AP WLAN communicator 101 and the first modulation-demodulation unit 131 by a Carrier Sense Multiple Access with Collision Avoidance (CSMA/CA) method.

The beacon transmitter 103 is configured to broadcast beacons based on a passive scan method, the beacon including the SSID of the access point 1 at least. The beacon is transmitted every about 100 msec periodically from the antenna 121 through the AP WLAN communicator 101 and the first modulation-demodulation unit 131 by a CSMA/CA method.

(Pointer Signal Generator 112)

The pointer signal generator 112 is adapted to generate a pointer signal including available-channel information of available channel(s) of the first frequency band and SSID(s). The pointer signal may include not only the available channel(s) and the SSID of the access point itself but also the available channel (s) and SSID (s) of other access point(s). The generated pointer signal is outputted to the AP pointer signal communicator 111.

(AP Pointer Signal Communicator 111)

The AP pointer signal communicator 111 is configured to transmit a pointer signal to wireless terminal(s) 2 using a specific channel of the second frequency band through the second modulation-demodulation unit 132 and the antenna 122. The pointer signal as well as the beacon is transmitted every about 100 msec periodically by a CSMA/CA method.

(Time Difference Calculator 113)

The access point 1 may include optionally a time difference calculator 113. The time difference calculator 113 is adapted to calculate a time difference information including the time difference from the present time to a time when transmitting the next beacon in the available channel. The calculated time difference information is outputted to the pointer signal generator 112. Then the time difference information, which the pointer signal generator 112 has included into the pointer signal, is thus transmitted to wireless terminal(s) 2. Hereby, the wireless terminal 2 can know the appropriate timing when it will stand by (wait) for receiving the next beacon in the available channel.

Figure 6:
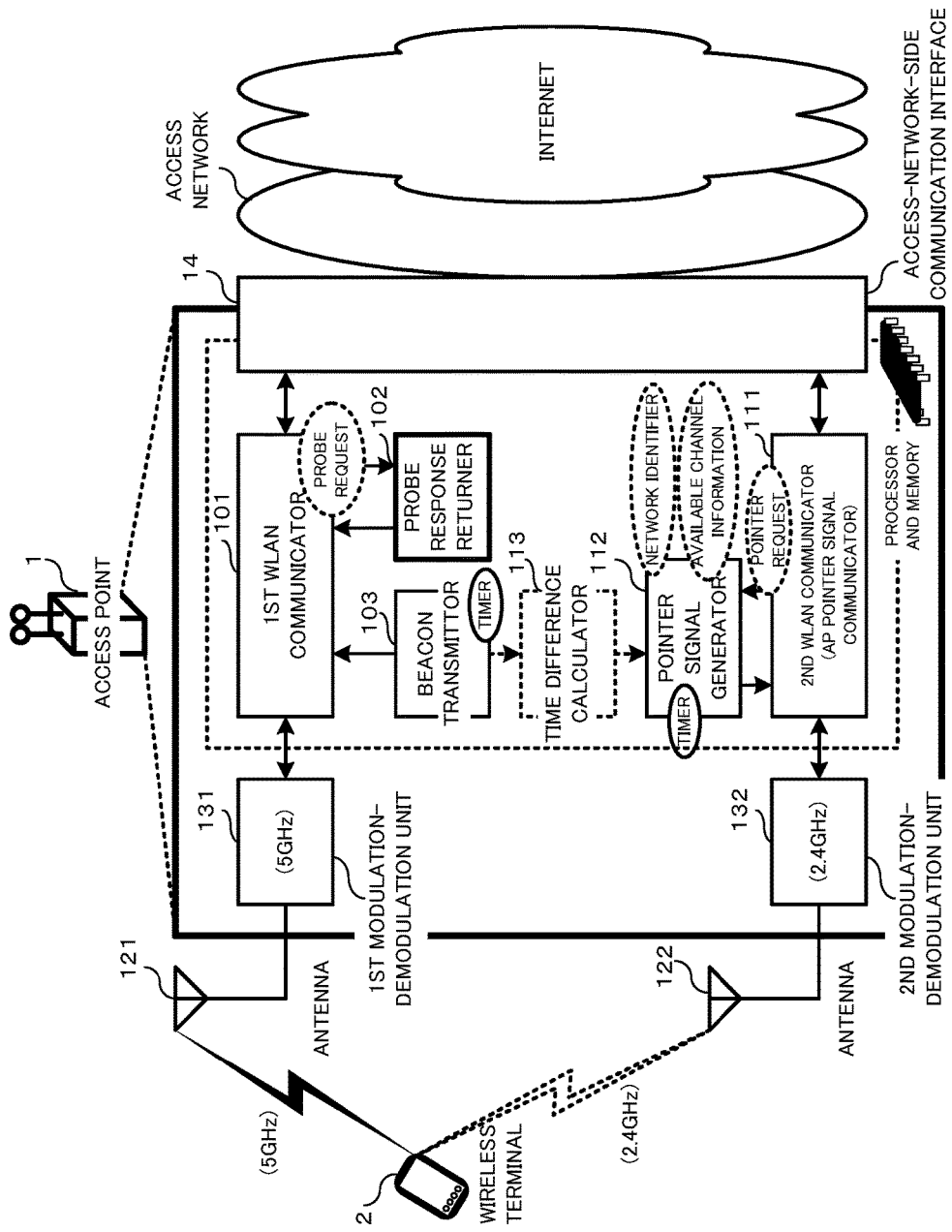
FIG. 6 is a functional block diagram illustrating the second embodiment of an access point according to the present invention.

FIG. 6 is a functional block diagram illustrating the second embodiment of an access point according to the present invention.

According to FIG. 6, an access point 1 uses two frequency bands in a WLAN unlike the access point shown in FIG. 5. The first frequency band is a 5 GHz band (or 2.4 GHz) band prescribed in the IEEE802.11 standard, and the second frequency band is a 2.4 GHz band (or 5 GHz) band prescribed in the IEEE802.11 standard. Therefore, transmitting a pointer signal does not require any use of another radio carrier. As shown in FIG. 6, the pointer signal generator 112 transmits a pointer signal to wireless terminal (s) 2 through the second AP WLAN communicator. Of course, the pointer signal generator 112 may transmit a pointer signal to wireless terminal(s) 2 by using another communication method for transmitting and receiving user data.

In a WLAN, Generally, there is much use of the 2.4 GHz band, in which access points and wireless terminals interfere much with one another. Therefore, communication using the 5 GHz band often brings a satisfactory communication quality. As shown in FIG. 6, the access point 1 sends to wireless terminal (s) 2 a pointer signal by using the 2.4 GHz band, which allows the wireless terminal 2 to find out available channel (s) of the 5 GHz band. Hereby, the wireless terminal 2 executes, with less required time, a communication connection sequence by using the available channel of the 5 GHz band for the access point 1.

As a matter of course, the access point 1 may comprise three or more AP WLAN communicators, though it is provided with two communicators according to FIG. 6. In this case, the pointer signal may include available channel information and the SSID (and time difference information) for every AP WLAN communicator.

Also as an alternative, the pointer signal generator 112 may send a pointer signal, like an active scan method in WLAN, when receiving a pointer request from the wireless terminal 2, although it is explained with reference to FIG. 5 and FIG. 6 that the pointer signal generator 112 periodically transmits a pointer signal to wireless terminal(s) 2. After all, the access point 1 transmits a pointer signal periodically or when receiving from the wireless terminal 2 a pointer request for the access point 1. On the other hand, the wireless terminal 2 always waits (is always on standby) for receiving a pointer signal, or waits (becomes on standby) for receiving a pointer signal after sending a pointer request to the access point 1.

Figure 7:
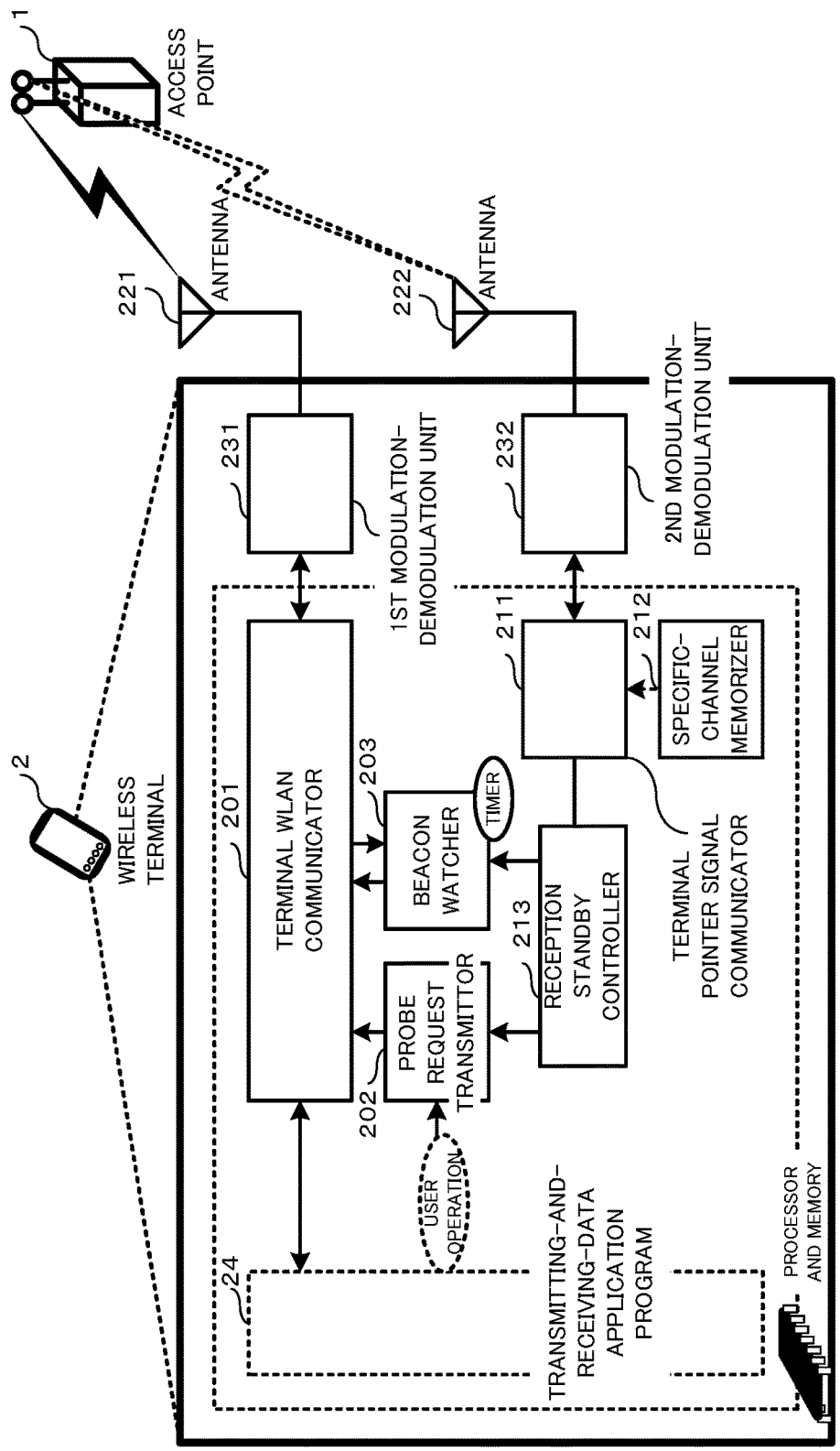
FIG. 7 is a functional block diagram illustrating one embodiment of a wireless terminal according to the present invention.

FIG. 7 is a functional block diagram illustrating one embodiment of a wireless terminal according to the present invention.

As shown in FIG. 7, the wireless terminal 2 is constructed to include, as hardware, two antennas 221 and 222 that communicate with access point(s) 1, the first modulation-demodulation unit 231 connected with the antenna 221, the second modulation-demodulation unit 232 connected with the antenna 222. The antenna 221 and the first modulation-demodulation unit 231 support the communication in the first frequency band with access point(s) 1. While, the antenna 222 and the second modulation-demodulation unit 232 support the communication in the second frequency band with access point(s) 1. Note that the first modulation-demodulation unit 231 and the second modulation-demodulation unit 232 may share a single antenna, utilizing each signal into which separated, by using such as a band-pass filter, are both signals transmitted respectively in the first and second frequency bands.

The wireless terminal 2 further includes, as functional units, a terminal WLAN communicator 201, a probe response transmitter 202, a beacon watcher 203, a terminal pointer signal communicator 211, a specific-channel memorizer 212, a reception standby controller 213, and a transmitting-and-receiving-data application program 24. These functional units are embodied by executing a corresponding program on a computer mounted on the wireless terminal.

The terminal WLAN communicator 201 is configured to execute a protocol control specified in the IEEE802.11 between the first modulation-demodulation unit 231 and the application program 24. The probe request transmitter 202 is adapted to transmit a probe request based on the active scan method through the terminal WLAN communicator to receive a probe response. The beacon watcher 203 is configured to control for waiting (standing by) for receiving a beacon used in the passive scan method.

(Specific-Channel Memorizer 212)

The specific-channel memorizer 212 is configured to memorize beforehand specific channel (s) used for sending a pointer signal, which allows the wireless terminal 2 to know in advance frequency channel(s) used for receiving the pointer signal. Preferably, the specific-channel memorizer 212 may memorize specific-channel information of the specific channel(s) each associated with an expiration period.

(Terminal Pointer Signal Communicator 211)

The terminal pointer signal communicator 211 is configured to receive a pointer signal through a specific channel of the second frequency band, the specific channel being memorized in the specific-channel memorizer 212. Note that it is preferable that the terminal pointer signal communicator 211 prevents a pointer signal transmitted in a specific channel whose expiration period passed from being received.

The wireless terminal 2 has only to detect a pointer signal transmitted in the specific channel because the access point 1 sends through the very specific channel a pointer signal periodically. Conventionally, a wireless terminal is required to search for an access point in all the frequency channels since it is unknown which frequency channel the wireless terminal can use to connect with the access point. Actually, the conventional wireless terminal has to search for an access point while switching among a plurality of channels used in the WLAN communicator. In contrast, the wireless terminal 2 according to the present invention does not require such a processing.

(Reception Standby Controller 213)

The reception standby controller 213 is configured to control waiting (standing by) for receiving a beacon or a probe response, which is a response to a sent probe request, in response to the available channel information and SSID included in the pointer signal, the beacon or the probe response being transmitted in the first frequency band from an objective access point to be connected.

Here, by receiving the pointer signal, the reception standby controller 213 know the available channel information and the SSID. Thus, it can determine whether or not the SSID is of an objective access point to be connected with the wireless terminal 2. If the SSID is not of the objective, the SSID is neglected to be discarded. If the SSID is of the objective, executed is waiting for a beacon by setting the terminal WLAN communicator and the modulation-demodulation unit to use the available channel. Alternatively, a probe request may be sent to the objective access point 1 through the available channel, thus a corresponding probe response being received.

Further, the reception standby controller 213 may shift to a sleep mode for saving consumption energy if not receiving any pointer signal despite waiting for a pointer signal in the specific channel during a predetermined time. The reception standby controller 213 then may return from the sleep mode after a predetermined time has further passed, to again perform the operation of waiting for a pointer signal.

Figure 8:
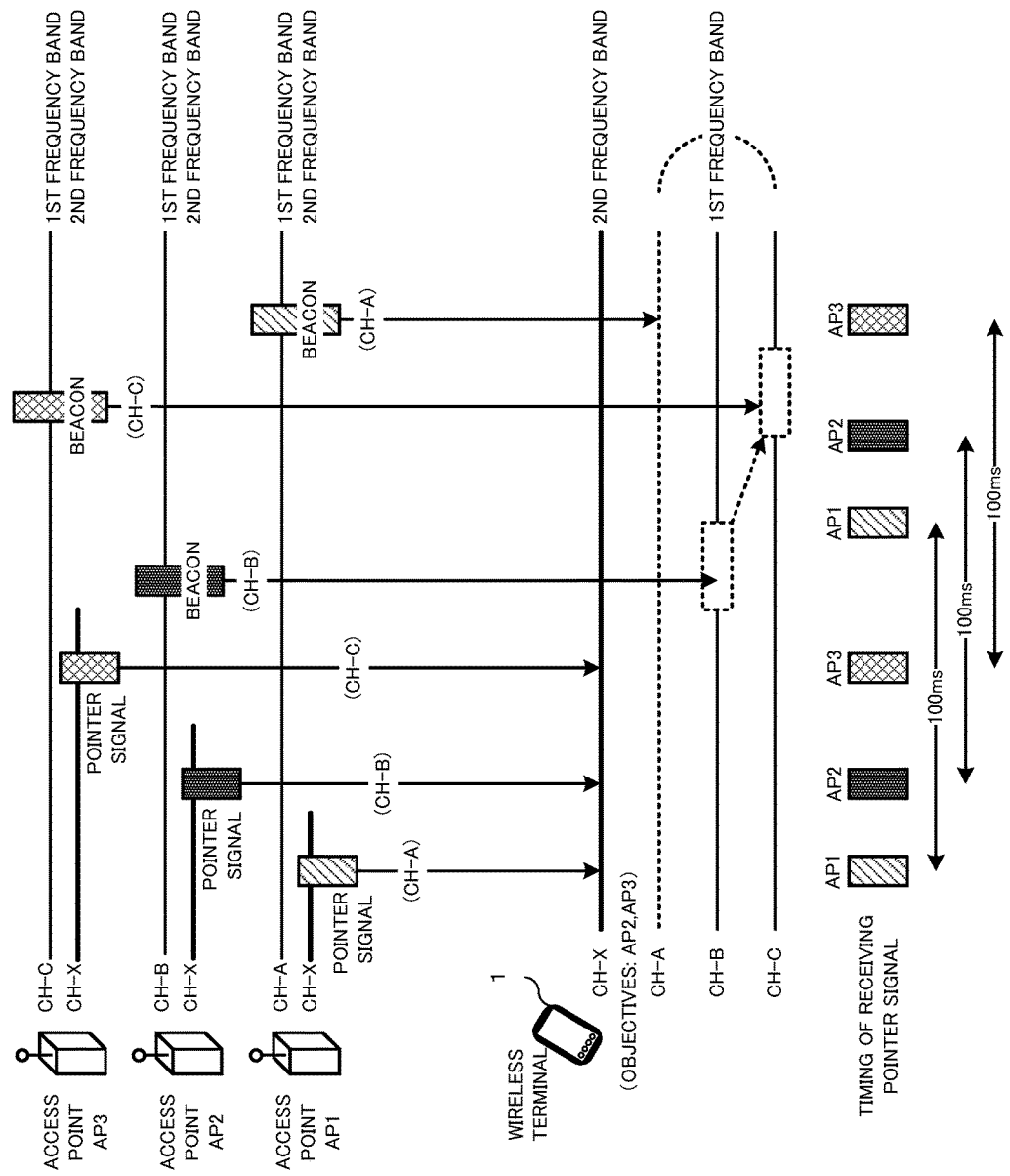
FIG. 8 is a sequence diagram illustrating communication sequence between plural access points and a wireless terminal according to the present invention.

Furthermore, in the case that the pointer signal includes "time difference information", the reception standby controller 213 may perform an operation of waiting for sensing a beacon transmitted in the available channel at a timing when the time difference elapses after receiving the pointer signal (see FIG. 8). Meanwhile, during other than the timing, the wireless terminal 2 may shift to a sleep mode, thereby reducing consumption energy.

Moreover, in the case where the pointer signal includes a plurality of pairs of the available channel information and the SSID, each of the pairs being associated with time difference information, the reception standby controller 213 may perform a control operation of waiting for sensing a beacon transmitted in an available channel sequentially according to the order of the available channel associated with less time difference, the time difference corresponding to a time till receiving the next beacon (see FIG. 8). Hereby, even if there are a plurality of objective access points to be connected, all the necessary beacons can be received effectively in as short a time as possible.

Furthermore, in the case when there passed the expiration period of the specific-channel information corresponding to the present area, the reception standby controller 213 may perform a control operation of sensing beacons transmitted in all the channels of the first frequency band.

(Time Needed for Discovering Objective Access Point)

Hereinafter, there will be considered a case in which the period of transmitting a pointer signal from an access point is 100 msec and the period of transmitting a beacon from an access point is also 100 msec. Conventionally, there can be calculated the time needed for discovering an objective access point as follows.

"The time needed for searching all the available channels"=2095 msec as a maximum "The average time needed for discovering an objective access point to be connected" = 2095 msec/2 = 1047.5 msec In contrast, according to the present invention, the corresponding calculation is as follows.

"The maximum time needed for discovering an objective access point" = 100 msec + 100 msec = 200 msec Further, in the case using pointer request and prove request according to the present invention, the above-mentioned time becomes 5 msec+5 msec=10 msec under the condition that respective responses to the pointer request and the prove request are sent in 5 msec from an access point.

(Time Needed for Judging Objective Access Point not to be Discovered)

In the conventional art, a wireless terminal has to keep, during the time (2095 msec as a maximum) for searching all the available channels, a starting state of WLAN communicating function. In contrast, according to the present invention, the wireless terminal activates, during 100 msec, the terminal pointer signal communicator. Then, if having not received during that time a pointer signal from an objective access point to be connected, the wireless terminal may shift to a sleep mode. Alternatively, in the case where the wireless terminal sends to the access point a pointer request to receive a pointer signal, it can judge in about 15 msec whether or not to shift to a sleep mode. Such a processing with the sleep mode is effective from the viewpoint of the reduction in consumption energy of the wireless terminal.

Further, when receiving no pointer signal from the access point 1 corresponding to the objective SSID, the wireless terminal 2 thereafter sends no probe request. Here, the probe request is transmitted from the wireless terminal 2 just only through the available channel of the objective access point 1 to be connected. As a result, there can be suppressed a congestion of the wireless environment generated from sending wasted probe requests and probe responses.

(Setting of Specific Channel for Pointer Signal)

The 2.4 GHz band in a WLAN allows a channel setting, for example, from channel 1 to channel 13. However, in order to avoid any inter-channel interference, just allowed is a three-channel setting, for example, a setting of channel 1, channel 6 and channel 11. Thus, in the case in which the 2.4 GHz band is used for setting a specific channel through which transmitted is the pointer signal according to the present invention, it is preferable to use, for example, either of channel 1, channel 6 and channel 11. Here, the transmitted pointer signal includes the available channel information in the 5 GHz band and the SSID. Therefore, the wireless terminal 2 only has to receive the pointer signal just only through, in this example, channel 1, channel 6 or channel 11 to find out an available channel of the 5 GHz which is used by the access point.

(Reduction in Consumption Energy)

Here, considered is a case in which a conventional wireless terminal scans by an active scan method all the 13 channels of the 2.4 GHz band and scans by a passive scan method all the 19 channels of the 5 GHz band in order to search for an access point. In this case, the amount of consumption energy needed for scanning all the channels is calculated as follows.

680 µJ×13ch+4000 µJ×19ch=84840 µJ

In contrast, the amount of consumption energy according to the present invention is calculated as follows under a typical case that the time needed for waiting for receiving a pointer signal is 100 msec only and the time needed for waiting for receiving a beacon is also 100 msec only.

40 mW×200 ms=8000 µJ

Considering these cases, it is understood that the amount of consumption energy according to the present invention may be of one-tenth compared to that in the conventional art.

Further, in the case in which the wireless terminal waits for receiving a pointer signal by an active method, the amount of consumption energy is calculated as follows. That is, under the case that:

"The data size of a pointer request"=300 bytes (an assumed value that is the same as that of the probe request); and "The time needed for waiting for receiving a pointer signal"=15 msec, the additional amount of consumption energy per one channel in the active method is calculated as only 680 µJ. Hereby, it is understood that, the amount of consumption energy according to the present invention is extremely reduced compared to that of 84840 µJ in the conventional case, under the condition that the wireless terminal scans all the channels in the end because it cannot find out an access point corresponding to the objective SSID.

FIG. 8 is a sequence diagram illustrating communication sequence between plural access points and a wireless terminal according to the present invention.

As illustrated in FIG. 8, it is assumed that there exist three access points AP1, AP2 and AP3 around a wireless terminal 2. Each access point transmits a pointer signal in every 100 ms through a specific channel CH-X. In this case, the wireless terminal 2 can receive the pointer signals sent from all the access points AP1, AP2 and AP3 within a time interval of 100 msec, even if waiting (standing by), at an arbitrary timing, for receiving a pointer signal in the channel CH-X.

| <access point> | <available channel> | <SSID> |
|---|---|---|
| AP1 | CH-A | ID-AP1 |
| AP2 | CH-B | ID-AP2 |
| AP3 | CH-C | ID-AP3 |

Here, also assumed is that the SSIDs of the objective access points to be connected are ID-AP2 and ID-AP3. The wireless terminal 2 can receive beacons transmitted from the access points AP2 and AP3 by switching one of the corresponding frequency channels for signal reception to the other as shown in FIG. 8. The characteristic times needed for waiting for receiving respective pointer signals in the frequency channels CH-B and CH-C are 100 ms. Nonetheless, the wireless terminal can switch a channel in use, at the timing of receiving a beacon, to the next available channel through which it waits for receiving a beacon. Each beacon is transmitted in every 100 ms. Thus, the maximum total time needed for waiting the corresponding signals in the channels CH-X, CH-B and CH-C amounts to 300 msec.

Here, in the case where the pointer signal includes "time difference information" which indicates a time until the transmission of the next beacon, it is preferable that the wireless terminal switches over the available channels sequentially according to the order of the corresponding beacon associated with less time difference. In the practical example shown in FIG. 8, the time difference of the beacon transmitted through the channel CH-B is smaller than that of the beacon transmitted through the channel CH-C. On the contrary, if the time difference of the beacon of the channel CH-C is smaller than that of the beacon of the channel CH-B, the wireless terminal would wait for receiving, at the beginning, the beacon of the channel CH-C.

Thus, according to the present invention, even in the case of using the passive method, the searching for the access point can be completed in 200 msec at most as follows.

"The time needed for waiting for receiving a pointer signal"=100 msec

"The time needed for waiting for receiving a beacon"=100 msec 100 msec+100 msec=200 msec When there are a time difference, which is 100 msec as a maximum in the above case, until the timing of transmitting a beacon from the access point, the wireless terminal may shift to a sleep mode during that time to reduce consumption energy. Further, by adapting an active method to the operation of pointer signal reception (including the pointer request transmission) and to the operation of probe response reception (including the probe request transmission), the time needed for searching for an access point can be shortened furthermore.

(Recognizing Specific Channel for Pointer Signal by Wireless Terminal)

The wireless terminal may store in advance a specific channel through which a pointer signal is transmitted. For example, the specific channel for the pointer signal may be uniquely determined by the telecommunications carrier, who installed access points, thus to be set in every wireless terminal. Alternatively, the pointer signal may be set by the user or through a control signal transmitted from the telecommunications carrier.

However, access points are sometimes forced to change the specific channel for the pointer signal due to some reasons. In this situation of changing the specific channel, since receiving no pointer signal through the given specific channel, the wireless terminal judges that there exists no objective access point to be connected around the terminal itself. To avoid such misjudge, the wireless terminal 2 may perform operations of waiting for receiving pointer signal by a predetermined number (N) of times. Then, if not receiving any pointer signal, the wireless terminal 2 shifts to a normal scan operation.

It is also preferable that the access point, assuming the possibility for the wireless terminal 2 to shift to the normal scan, includes the specific-channel information of the pointer signal in the second frequency band into beacon(s) or probe response(s) which transmit through the available channel(s) of the first frequency band. Then, even in the preferable case, if the wireless terminal 2 does not succeed, through tries by a predetermined number of times or during a predetermined time period, in receiving any pointer signal in the specific channel, the wireless terminal 2 shifts from the pointer signal scan to the normal scan, thereby to sense beacon (s) which is transmitted through either of all the channels of the first frequency band.

When the wireless terminal 2 discovers an objective access point to be connected, it updates the information memorized by the specific-channel memorizer based on the specific-channel information included in the beacon received from the access point or in the probe response that is a response to the sent probe request. This update allows the wireless terminal to immediately search for the objective access point, from the next time, by performing the pointer signal scan. Note that the wireless terminal does not update the specific-channel information memorized in advance when discovering no objective access point.

Thus, Even if the wireless terminal fails N times in the pointer signal scan, it can try to succeed in the pointer signal scan that starts after performing the normal scan.

Figure 9:
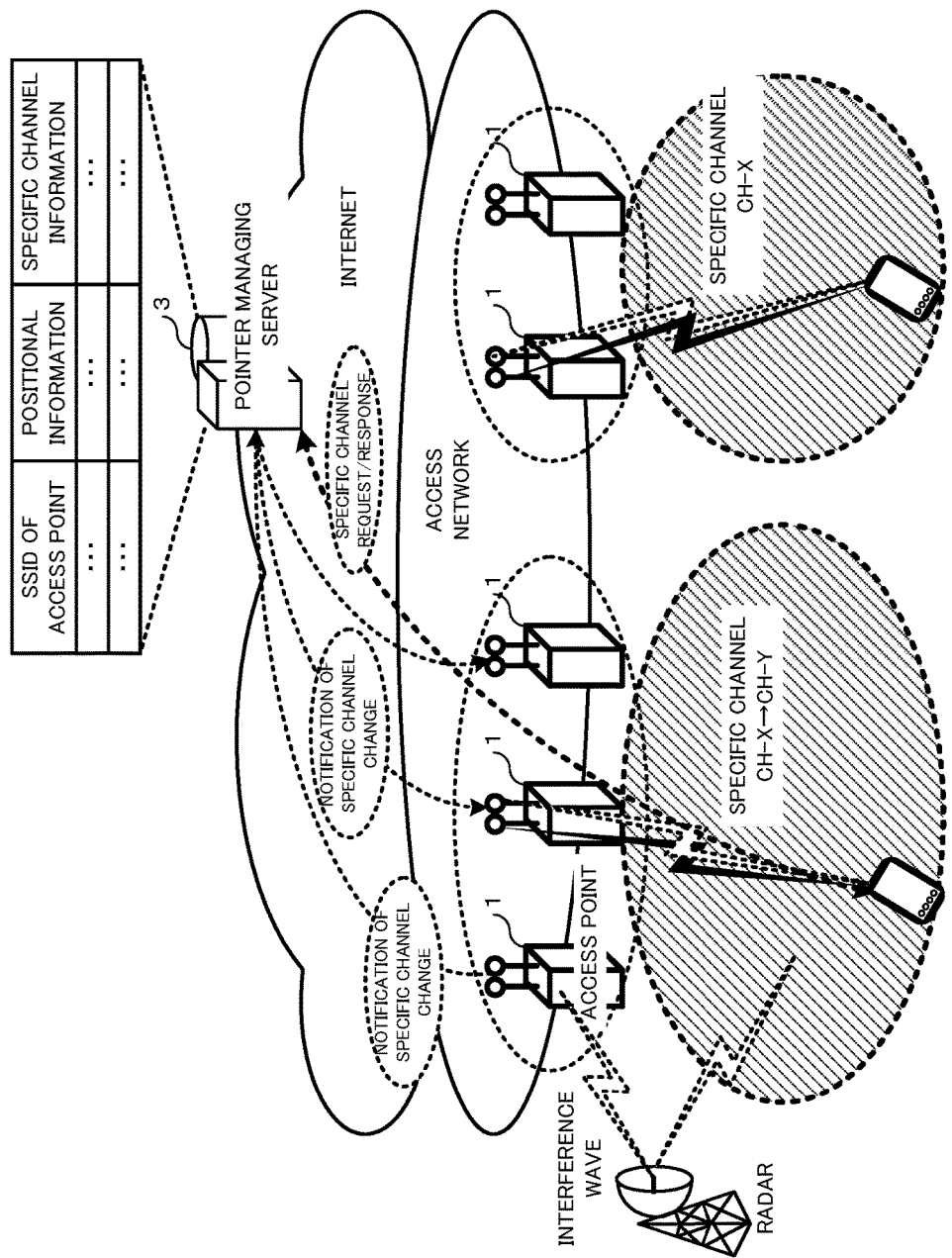
FIG. 9 is a schematic diagram showing the configuration of a system further including a pointer managing server and a base station used for WWAN communication.

FIG. 9 is a schematic diagram showing the configuration of a system further including a pointer managing server and a base station used for Wireless Wide Area Network (WWAN) communication.

In the system shown in FIG. 9, there further disposed is a pointer managing server 3 adapted for communicating through a network with access points 1 and wireless terminal (s) 2. The pointer managing server 3 is configured to accumulate location information and specific-channel information for every access point.

Here, the access point 1 may sometimes recognize a state in which any specific channel is not available. Note that communication in the 5 GHz band specified by the WLAN standards shares common frequency with other system such as a radar. Therefore, the access point 1 monitors frequency channel (s), e.g. for about 30 minutes, to confirm whether or not any other system exists which is likely to affect the frequency channel (s). After that, the access point 1 can judge whether or not there occurs a problem derived from sending electric wave through the frequency channel (s). As understood from that, the wireless terminal 2 cannot use, in the 5 GHz band, an active scan as a method for confirming the existence of the access point 1. As a result, in order to connect with an access point 1, the wireless terminal 2 is required to search for beacon in all the channels used by the access points 1, which leads to a problem that such a searching needs considerable time. Therefore, in the case of sending a pointer signal in a specific channel of the 5 GHz band, the access point 1, when detecting an interference wave generated from such as a radar, sends to the pointer managing server 3 the information of changing the present specific channel to another specific channel.

Then, the pointer managing server 3, when receiving the information of the change of specific channel from the access point 1, instructs access point (s) located in a predetermined range from the access point 1 to shift to another specific channel. In this case, there set is the common specific channel for pointer signals in the area within the predetermined range. In FIG. 9, a plurality of access points positioned in the predetermined range are instructed to change the specific channel CH-X to CH-Y.

Further, as shown in FIG. 9, the wireless terminal 2 sends to the pointer managing server 3 a "request" (inquiry request) including a network identifier corresponding to the objective access point to be connected in order to obtain a specific channel through which a pointer signal is to be received. Then, the pointer managing server 3 return to the wireless terminal 2 a "response" (reply to inquiry) including specific-channel information of the specific channel for the pointer signal of the access point associated with the network identifier. Hereby, the wireless terminal 2 succeeds in knowing the updated specific channel for the pointer signal.

Figure 10:
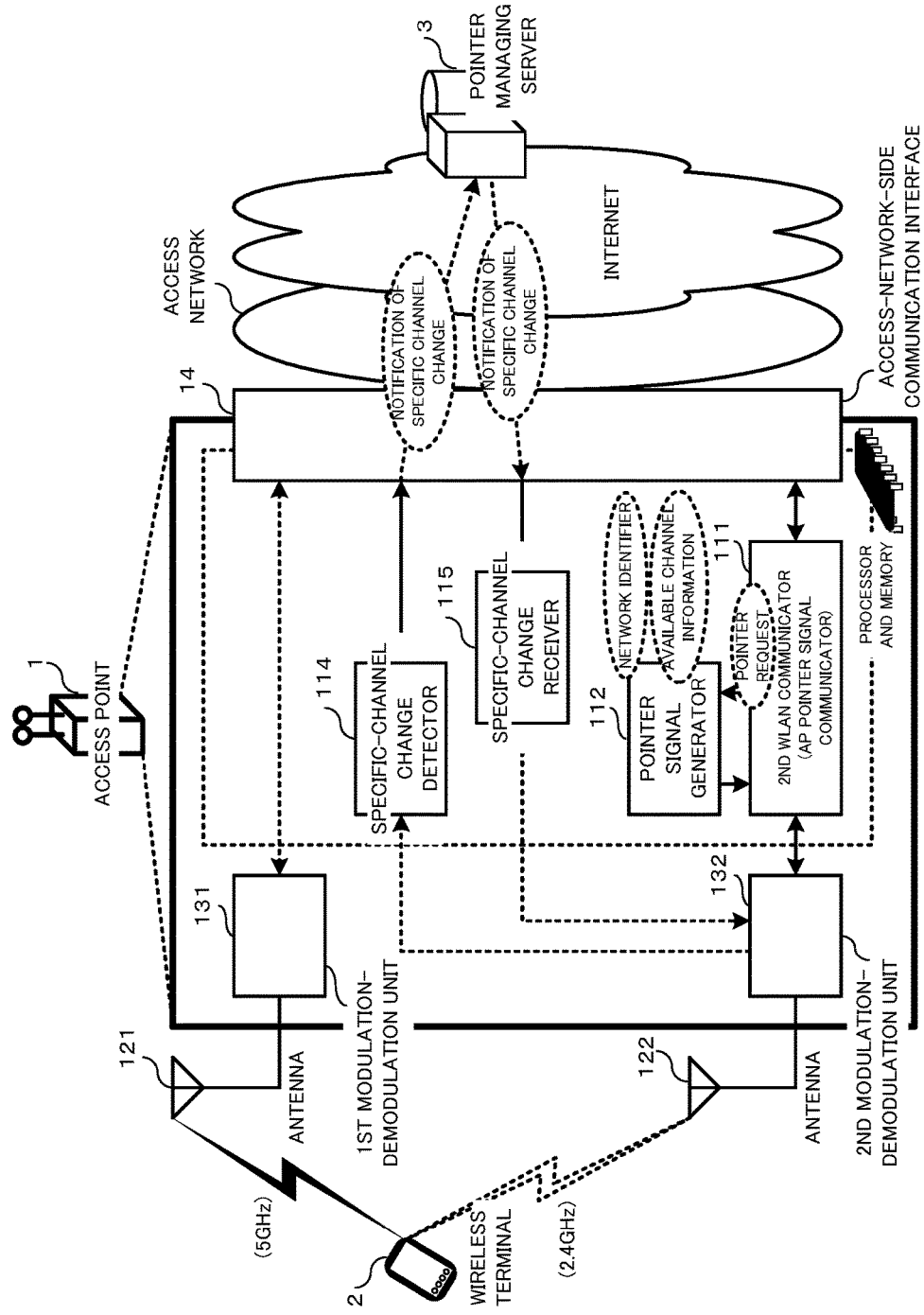
FIG. 10 is a functional block diagram illustrating one embodiment of an access point that can change the specific channel.

FIG. 10 is a functional block diagram illustrating one embodiment of an access point that can change the specific channel.

According to FIG. 10, the access point 1 includes a specific-channel change detector 114 and a specific-channel change receiver 115 unlike the access point 1 shown in FIG. 6. The specific-channel change detector 114 is configured, when detecting an interference wave in a specific channel used in the second modulation-demodulation unit 132, to send to the pointer managing server 3 the information of changing the specific channel to another specific channel. The specific-channel change receiver 115 is configured to set the updated specific channel received from the pointer managing server 3 as a specific channel used in the second modulation-demodulation unit 132.

Figure 11:
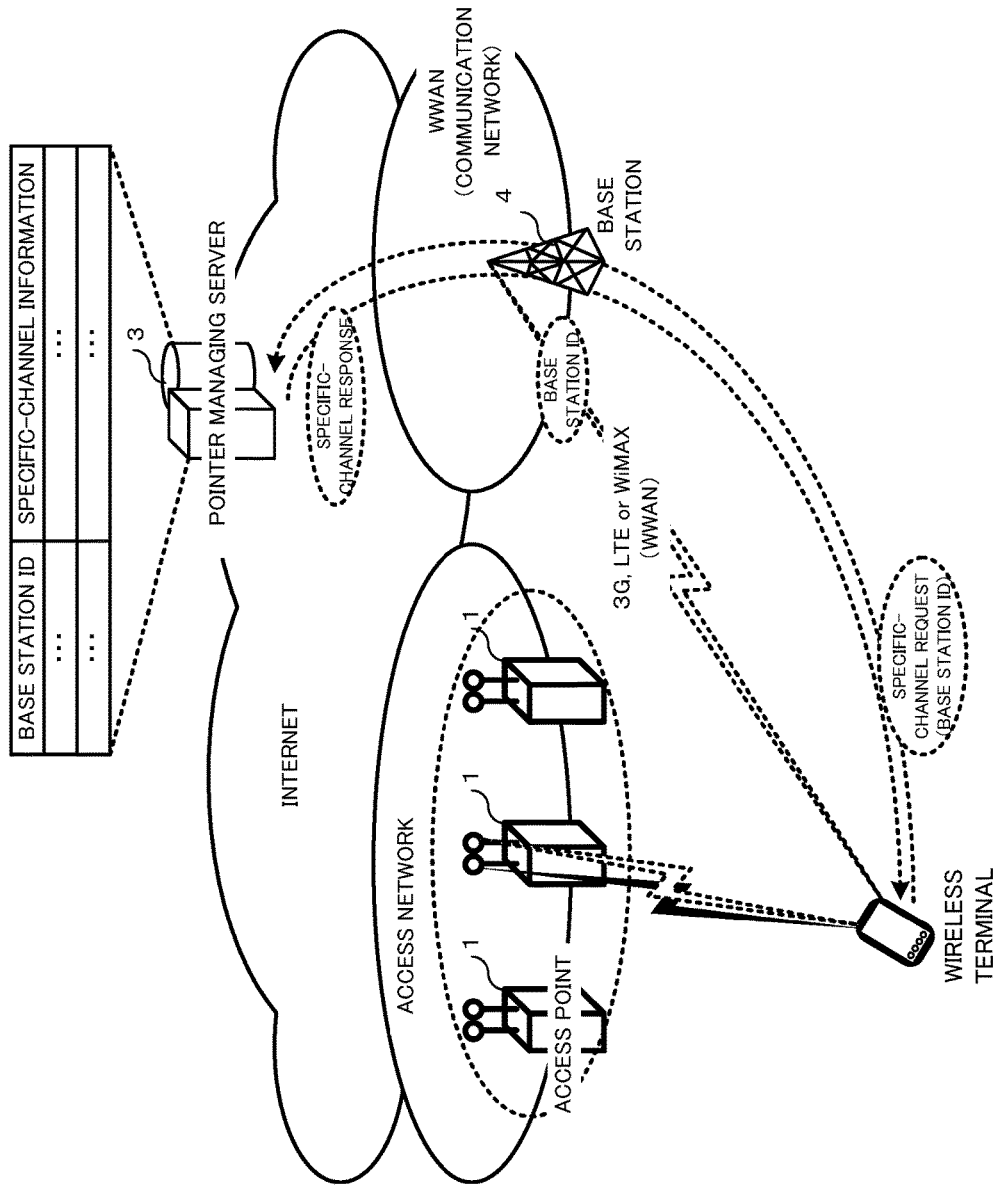
FIG. 11 is a schematic diagram showing the configuration of a system configured to inquire the specific channel using the identifier of a base station installed in a WWAN.

FIG. 11 is a schematic diagram showing the configuration of a system configured to inquire the specific channel using the identifier of a base station installed in a WWAN.

The system shown in FIG. 11 disposes a base station 4 in a WWAN (communication network), unlike the system shown in FIG. 9, and a wireless terminal 2 can communicate with the base station 4 through the WWAN. The WWAN may be, for example, 3G, WiMAX or LTE. The base station 4 includes the identifier (ID) of the base station 4 itself into a "control signal" then to broadcast the control signal toward wireless terminal(s) 2.

The wireless terminal 2 sends a (inquiry) request including the base station ID, through the base station 4, to the pointer managing server 3. Then, the pointer managing server 3 returns to the wireless terminal 2 a (inquiry) response including specific-channel information of the specific channel(s) for the pointer signal(s) of the access point(s) located on the periphery of the base station associated with the base station ID. Note that the wireless terminal 2 may send the request to the pointer managing server 3, only when the specific-channel memorizer 212 does not memorize any specific-channel information or when the expiration period of the memorized specific-channel information has already passed.

Figure 12:
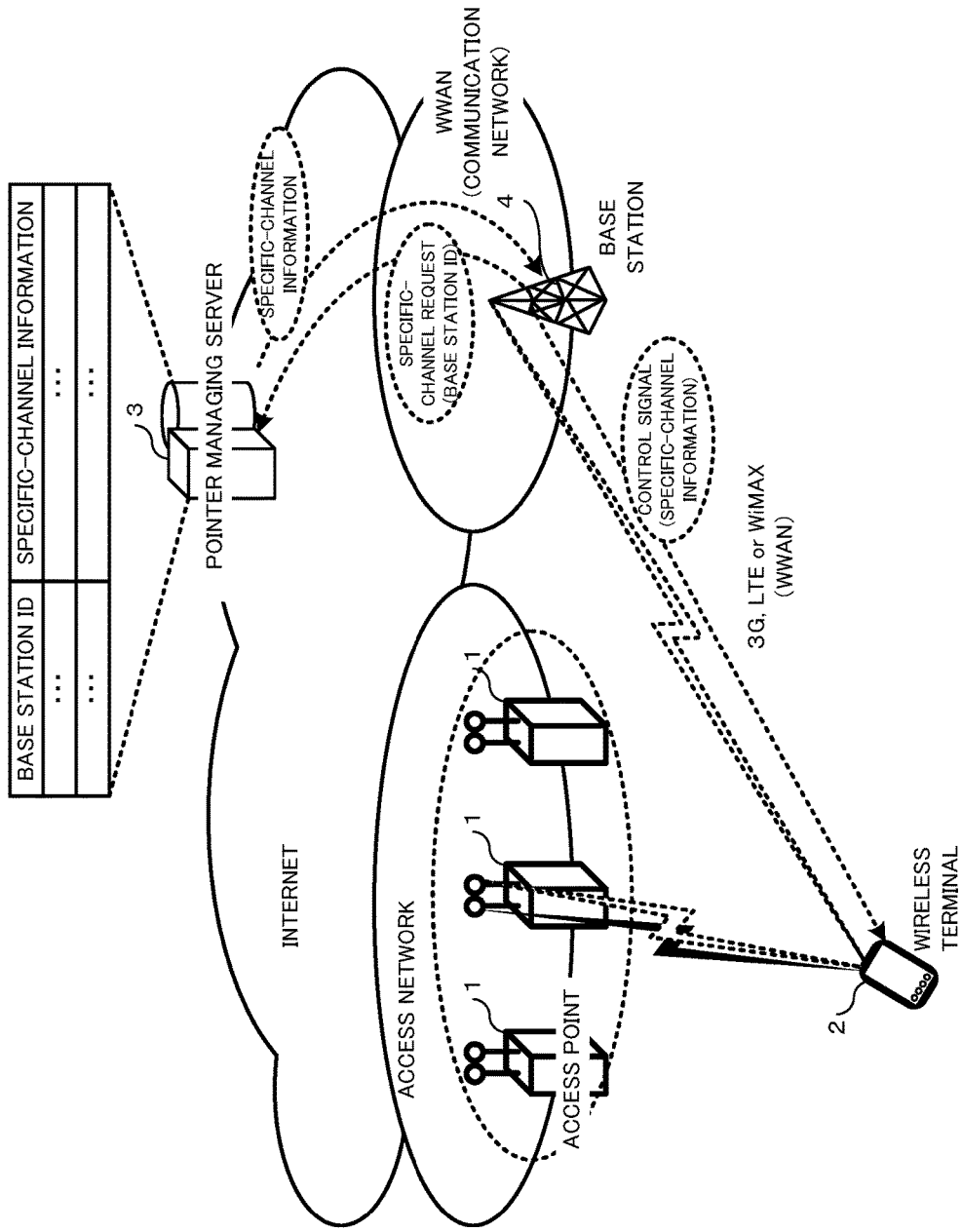
FIG. 12 is a schematic diagram showing the configuration of a system configured to recognize the specific channel using a control signal transmitted from a base station installed in a WWAN.

FIG. 12 is a schematic diagram showing the configuration of a system configured to recognize the specific channel using a control signal transmitted from a base station installed in a WWAN.

As shown in FIG. 12, the base station 4 obtains from the pointer managing server 3 specific-channel information of the specific channel (s) for the pointer signal (s) of the access point (s) located on the periphery of the base station associated with the base station identifier, unlike the base station 4 shown in FIG. 11. Then, the base station 4 includes the specific-channel information into a "control signal" and broadcasts the control signal. By receiving the control signal, the wireless terminal 2 can know the specific channel transmitted from an access point 1 located in the peripheral area. In the embodiment shown in FIG. 12, the wireless terminal 2 does not inquire any specific-channel information but uses the control signal, which is always broadcasted from the base station 4, to automatically update the specific-channel information memorized in the specific-channel memorizer 212.

Figure 13:
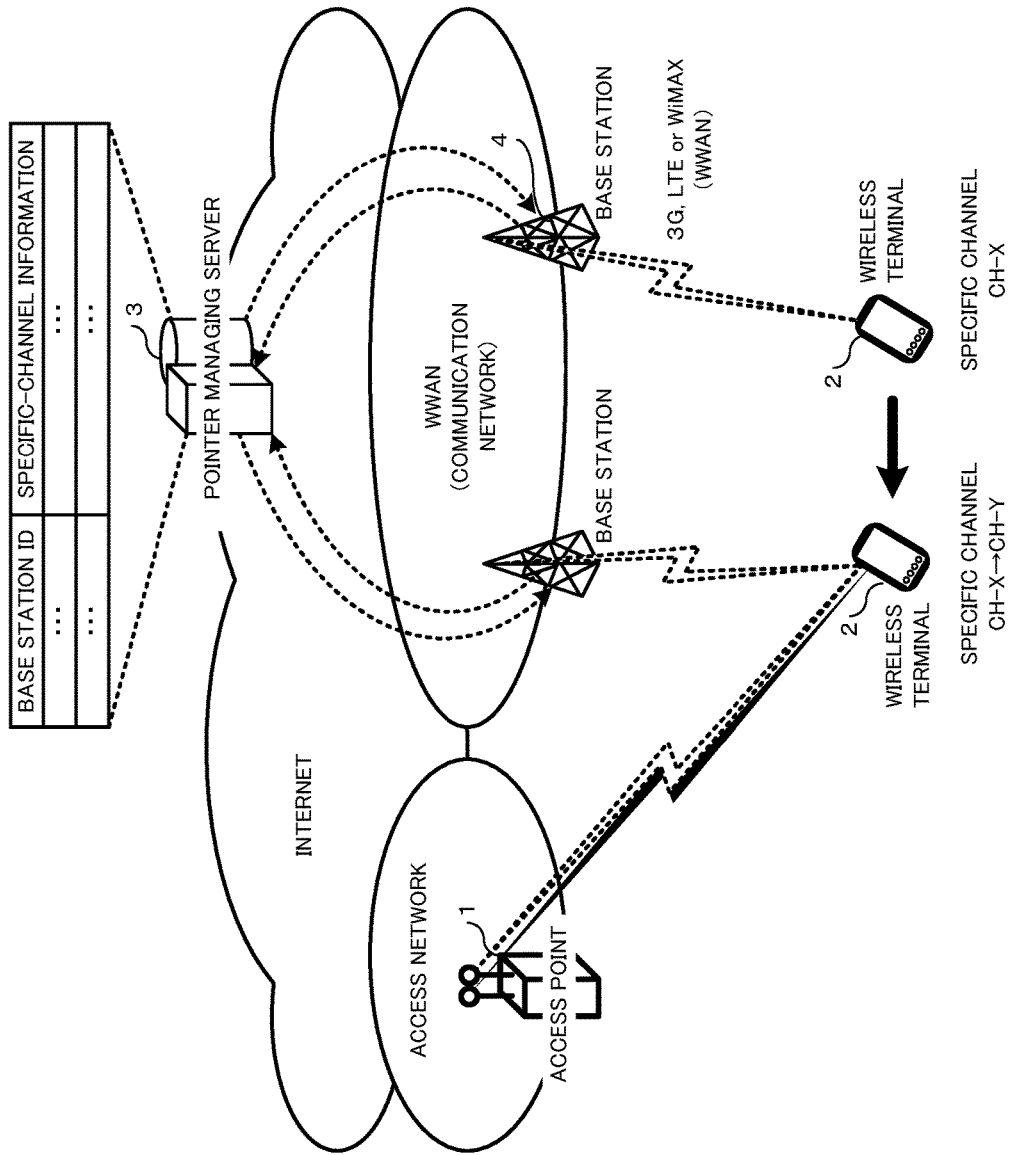
FIG. 13 is a schematic diagram showing the configuration of a system configured to update the specific channel in response to the wireless terminal movement.

FIG. 13 is a schematic diagram showing the configuration of a system configured to update the specific channel in response to the wireless terminal movement.

In FIG. 13, the specific-channel memorizer 212 of the wireless terminal 2 memorizes the specific channels, each being further associated with the corresponding base station ID. The wireless terminal 2 moves then to recognize the change of base station ID, the base station ID being included in the control signal broadcasted from each base station 4 in whose area the wireless terminal exists each moment. Thus, the wireless terminal 2 refers to the specific-channel memorizer 212 to find out the specific channel associated with the base station ID of the present base station 4. If there is not any specific-channel information associated with the base station ID of the present base station 4 in the specific-channel memorizer 212, the wireless terminal 2 sends to the pointer managing server 3 a (inquiry) request including the base station ID. Then, the pointer managing server 3 returns to the wireless terminal 2 a (inquiry) response including the specific-channel information of the pointer signal (s) of access point (s) located around the base station corresponding to the base station ID. This hereby allows the specific channel to automatically be updated. Note that, in the case where the base station 4 broadcasts a control signal including the specific-channel information, it is also preferable that the wireless terminal 2 updates the specific channel memorized in the specific-channel memorizer 212 without sending any request to the pointer managing server 3.

Figure 14:
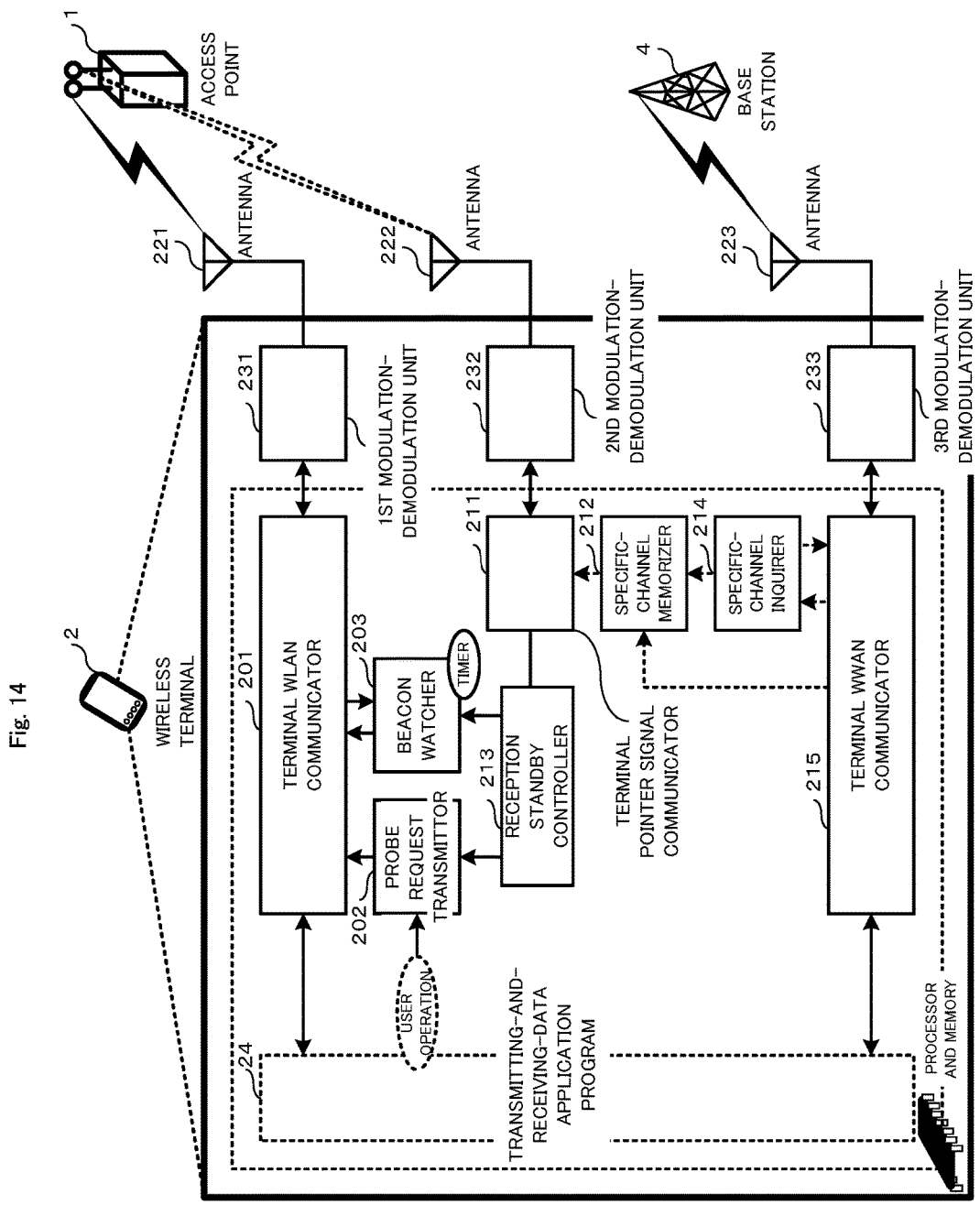
FIG. 14 is a functional block diagram illustrating one embodiment of a wireless terminal configured to automatically update the specific channel.

FIG. 14 is a functional block diagram illustrating one embodiment of a wireless terminal configured to automatically update the specific channel.

According to FIG. 14, the wireless terminal 2 further comprises an antenna 223 for WWAN, the third modulation-demodulation unit 233, a specific-channel inquirer 214 and the terminal WWAN communicator 215, unlike the wireless terminal 2 shown in FIG. 7. The specific-channel inquirer 214 is configured to send a (inquiry) request including a base station identifier through the terminal WWAN communicator 215 to the pointer managing server 3, then to receive a (inquiry) response including specific-channel information. The terminal WWAN communicator 215 is configured, in the case where the specific-channel information is included in the control signal received from the base station 4, to output the included specific-channel information to the specific-channel inquirer 214. The specific-channel information obtained by the specific-channel inquirer 214 is outputted to the specific-channel memorizer 212.

As explained above in detail, The system, the program and the method according to the present invention allows a wireless terminal to discover an objective access point with a comparatively small amount of consumption energy and in a comparatively short waiting time. Further, they enables a congestion of wireless communication environment to be relaxed by suppressing the transmission of wasted signals.

Many widely different alternations and modifications of the above-described various embodiments of the present invention may be constructed without departing from the spirit and scope of the present invention. All the foregoing embodiments are byway of example of the present invention only and not intended to be limiting. Accordingly, the present invention is limited only as defined in the following claims and equivalents thereto.

REFERENCE SIGNS LIST 1 access point; 101 AP WWAN communicator; 102 prove response returner; 103 beacon transmitter; 111 AP pointer signal communicator; 112 pointer signal generator; 113 time difference calculator; 114 specific-channel change detector; 115 specific-channel change receiver; 121 and 122 antenna; 131 and 132 modulation-demodulation unit; access-network-side communication interface; 2 wireless terminal; 201 terminal WLAN communicator; 202 probe request transmitter; 203 beacon watcher; 211 terminal pointer signal communicator; 212 specific-channel memorizer; 213 reception standby controller; 214 specific-channel inquirer; 215 terminal WWAN communicator; 221 to 223 antenna; 231 to 233 modulation-demodulation unit; 3 pointer managing server; and 4 base station.

What is claimed is:

1. An access point communicating with at least one wireless terminal through a Wireless Local Area Network [WLAN], the access point comprising:
    an access-point WLAN communicator configured for using a predetermined available channel of a first frequency band to communicate with the at least one wireless terminal;
    a time difference calculator configured to calculate time difference information of the access point, the time difference information including a time difference between a current time and a time when a next beacon is transmitted from the access point in the available channel;
    a pointer signal generator configured to generate a pointer signal including available-channel information for the available channel of the first frequency band, a network identifier in the first frequency band, and the time difference information of the access point; and
    an access-point pointer signal communicator configured to send the pointer signal to the at least one wireless terminal that is still not associated with the access point,
    the access point notifying the at least one wireless terminal of the time difference information of the access point to cause the at least one wireless terminal to await sensing of the beacon or a probe response transmitted in the available channel around a timing when the time difference elapses after receiving the pointer signal including the time difference information of the access point.

2. The access point as claimed in claim 1, wherein the access-point pointer signal communicator is adapted for using a specific channel of a second frequency band to send the pointer signal to the at least one wireless terminal.

3. The access point as claimed in claim 2, wherein the first frequency band is a 5 GHz band or 2.4 GHz band prescribed in the IEEE802.11 standard, and the second frequency band is a 2.4 GHz band or 5 GHz band prescribed in the IEEE802.11 standard.

4. The access point as claimed in claim 1, wherein the pointer signal generator is adapted for generating the pointer signal including a plurality of pairs of the available channel information and the network identifier, each of the pairs being associated with the time difference information, and wherein the access point notifies the at least one wireless terminal of the plurality of the time differences to cause the at least one wireless terminal to await sensing of a beacon transmitted in each available channel sequentially according to the order of the available channel associated with less time difference.

5. The access point as claimed in claim 1, wherein the access-point pointer signal communicator is adapted to use a passive scan method in which the pointer signal is sent periodically or an active scan method in which the pointer signal is sent when receiving a pointer request transmitted from the at least one wireless terminal.

6. A wireless terminal communicating with an objective access point to be connected thereto through a WLAN, the wireless terminal comprising:
- a terminal WLAN communicator configured for using an available channel of a first frequency band to communicate with the access point; and
- a terminal pointer signal communicator configured to receive from the objective access point that is still not associated with the wireless terminal, a pointer signal including available-channel information for the available channel of the first frequency band, a network identifier in the first frequency band, and time difference information of the objective access point, the time difference information including a time difference between a current time and a time when a next beacon is transmitted from the objective access point in the available channel,
- the terminal WLAN communicator awaiting, in the obtained available channel, sensing of the beacon or a probe response transmitted from the objective access point around a timing when the obtained time difference elapses after receiving the pointer signal including the time difference information of the objective access point.

7. The wireless terminal as claimed in claim 6, wherein the terminal WLAN communicator is adapted to shift to a sleep mode until around a timing when the obtained time difference elapses after receiving the pointer signal including the time difference information.

8. The wireless terminal as claimed in claim 6, further comprising a specific-channel memorizer configured to memorize beforehand the specific channel used for the pointer signal,
wherein the terminal pointer signal communicator is adapted to receive the pointer signal through the specific channel of a second frequency band.

9. The wireless terminal as claimed in claim 8, wherein the first frequency band is a 5 GHz band or 2.4 GHz band prescribed in the IEEE802.11 standard, and the second frequency band is a 2.4 GHz band or 5 GHz band prescribed in the IEEE802.11 standard.

10. The wireless terminal as claimed in claim 6, wherein the pointer signal includes a plurality of pairs of the available channel information and the network identifier, each of the pairs being associated with the time difference information, and wherein the terminal WLAN communicator is adapted to await sensing of a beacon transmitted in each available channel sequentially according to the order of the available channel associated with less time difference.

11. The wireless terminal as claimed in claim 6, wherein the terminal pointer signal communicator is adapted to use a passive scan method in which the terminal pointer signal communicator awaits sensing of the pointer signal without transmitting any pointer request, or an active scan method in which the terminal pointer signal communicator awaits sensing of the pointer signal after sending a pointer request to the access point.

12. A non-transitory computer-readable storage medium on which is stored a program to be executed by a computer mounted on an access point configured for communicating with at least one wireless terminal through a WLAN, the program causing the computer to function as:
- an access-point WLAN communicator configured for using a predetermined available channel of a first frequency band to communicate with the at least one wireless terminal;
- a time difference calculator configured to calculate time difference information of the access point, the time difference information including a time difference between a current time and a time when a next beacon is transmitted from the access point in the available channel;
- a pointer signal generator configured to generate a pointer signal including available-channel information for the available channel of the first frequency band, a network identifier in the first frequency band, and the time difference information of the access point; and
- an access-point pointer signal communicator configured to send the pointer signal to the at least one wireless terminal that is still not associated with the access point,
- the access point notifying the at least one wireless terminal of the time difference information of the access point to cause the at least one wireless terminal to await sensing of the beacon or a probe response transmitted in the available channel around a timing when the time difference elapses after receiving the pointer signal including the time difference information of the access point.

13. A non-transitory computer-readable storage medium on which is stored a program to be executed by a computer mounted on a wireless terminal configured for communicating with an objective access point to be connected thereto through a WLAN, the program causing the computer to function as:
- a terminal WLAN communicator configured for using an available channel of a first frequency band to communicate with the access point; and
- a terminal pointer signal communicator configured to receive, from the objective access point that is still not associated with the wireless terminal, a pointer signal including available-channel information for the available channel of the first frequency band, a network identifier in the first frequency band, and time difference information of the objective access point, the time difference information including a time difference between a current time and a time when a next beacon is transmitted from the objective access point in the available channel, the terminal WLAN communicator awaiting, in the obtained available channel, sensing of a beacon or a probe response transmitted from the objective access point around a timing when the obtained time difference elapses after receiving the pointer signal including the time difference information of the objective access point.

14. A method in which a wireless terminal discovers an objective access point to be connected thereto through a WLAN, the wireless terminal and the access point being configured for using a predetermined available channel of a first frequency band to communicate with each other, and the method comprising:

a first step, in the access point, of sending to the wireless terminal that is still not associated with the access point, a pointer signal including available-channel information for the available channel of the first frequency band, a network identifier in the first frequency band, and time difference information of the access point, the time difference information including a time difference between a current time and a time when a next beacon is transmitted from the access point in the available channel; and a second step, in the wireless terminal, of awaiting, in the obtained available channel, sensing of the beacon or a probe response around a timing when the obtained time difference elapses after receiving the pointer signal including the time difference information of the access point.

* * * * *